United States Patent
Zhao et al.

(10) Patent No.: US 11,722,668 B2
(45) Date of Patent: Aug. 8, 2023

(54) VIDEO ENCODER, VIDEO DECODER, AND CORRESPONDING METHOD

(71) Applicant: HUAWEI TECHNOLOGIES CO., LTD., Guangdong (CN)

(72) Inventors: Yin Zhao, Hangzhou (CN); Haitao Yang, Shenzhen (CN); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 233 days.

(21) Appl. No.: 17/336,712

(22) Filed: Jun. 2, 2021

(65) Prior Publication Data

US 2021/0289203 A1 Sep. 16, 2021

Related U.S. Application Data

(63) Continuation of application No. PCT/CN2019/121286, filed on Nov. 27, 2019.
(Continued)

(51) Int. Cl.
*H04N 19/122* (2014.01)
*H04N 19/119* (2014.01)
(Continued)

(52) U.S. Cl.
CPC ......... *H04N 19/122* (2014.11); *H04N 19/119* (2014.11); *H04N 19/176* (2014.11); *H04N 19/18* (2014.11); *H04N 19/61* (2014.11)

(58) Field of Classification Search
None
See application file for complete search history.

(56) References Cited

U.S. PATENT DOCUMENTS

2013/0107970 A1    5/2013  Wang et al.
2020/0021810 A1*   1/2020  Li ................... H04N 19/176
(Continued)

FOREIGN PATENT DOCUMENTS

CN    103370939 A    10/2013
CN    103460694 A    12/2013
(Continued)

OTHER PUBLICATIONS

ITU-T H.261 (Mar. 1993), Line Transmission of Non-Telephone Signals, Video Codec for Audiovisual Services at p x 64 kbits, total 29 pages.
(Continued)

*Primary Examiner* — Jessica M Prince
(74) *Attorney, Agent, or Firm* — Womble Bond Dickinson (US) LLP

(57) ABSTRACT

A video decoding method includes parsing a bitstream to obtain a split mode to transform units (TUs) in a current coding unit (CU). Each of the TUs has a serial number in a one-to-one correspondence with positions of the TUs in the current CU. A transform coefficient of a luminance transform block of a current TU in the TUs is obtained. A transform type of the luminance transform block of the current TU is obtained based on the split mode and a serial number of the current TU. An inverse transform on the transform coefficient of the luminance transform block of the current TU is performed based on the transform type of the luminance transform block of the current TU to obtain a reconstructed residual of the luminance transform block of the current TU. A reconstructed block of the current CU is obtained based on the reconstructed residual.

20 Claims, 8 Drawing Sheets

Related U.S. Application Data

(60) Provisional application No. 62/775,361, filed on Dec. 4, 2018.

(51) Int. Cl.
*H04N 19/176* (2014.01)
*H04N 19/18* (2014.01)
*H04N 19/61* (2014.01)

(56) References Cited

U.S. PATENT DOCUMENTS

2020/0186838 A1* 6/2020 Zhao .................... H04N 19/176
2021/0217202 A1* 7/2021 Zakharchenko ....... H04N 19/52

FOREIGN PATENT DOCUMENTS

| | | |
|---|---|---|
| CN | 104378637 A | 2/2015 |
| CN | 107165771 A | 9/2017 |
| CN | 107197264 A | 9/2017 |
| CN | 107431813 A | 12/2017 |
| CN | 108293112 A | 7/2018 |
| CN | 108712652 A | 10/2018 |
| CN | 108886613 A | 11/2018 |
| WO | 2018123644 A1 | 7/2018 |
| WO | 2018174457 A1 | 9/2018 |

OTHER PUBLICATIONS

ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Document: JVET-K0139-v3, Yin Zhao et al, CE6: Spatially Varying Transform (Test 6.1.12.1), Joint Video Experts Team (JVET) of ITU-T SG 16 WP 3 and ISO/IEC JTC 1/SC 29/WG11, 11th Meeting: Ljubljana, SI, Jul. 10-18, 2018, total 7 pages.
Xin Zhao et al, Enhanced Multiple Transform for Video Coding, 2016 Data Compression Conference, total 10 pages.

* cited by examiner

VIDEO ENCODER, VIDEO DECODER, AND CORRESPONDING METHOD

CROSS-REFERENCE TO RELATED APPLICATIONS

This application is a continuation of International Application No. PCT/CN2019/121286, filed on Nov. 27, 2019, which claims priority to U.S. Provisional Patent Application No. 62/775,361, filed on Dec. 4, 2018. The disclosures of the aforementioned applications are hereby incorporated by reference in their entireties.

TECHNICAL FIELD

The disclosure relates to the field of video encoding and decoding, and in particular, to a video encoder, a video decoder, and corresponding methods.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10 advanced video coding (AVC), the video coding standard H.265/high efficiency video coding (HEVC) standard, and extensions of such standards. The video apparatuses can transmit, receive, encode, decode, and/or store digital video information more efficiently by implementing such video compression technologies.

In the video compression technologies, spatial (intra-image) prediction and/or temporal (inter-image) prediction and/is performed to reduce or remove inherent redundancy in video sequences. In block-based video coding, a video slice (e.g., a video frame or a portion of a video frame) may be split into several image blocks, and the image blocks may also be referred to as a tree block, a coding unit (CU), and/or a coding node. An image block in a to-be-intra-coded (I) slice of an image is coded through spatial prediction based on a reference sample in a neighboring block in the same image. For an image block in a to-be-inter-coded (P or B) slice of an image, spatial prediction based on a reference sample in a neighboring block in the same image or temporal prediction based on a reference sample in another reference image may be used. The image may be referred to as a frame, and the reference image may be referred to as a reference frame.

SUMMARY

Embodiments of the disclosure provide a video decoding method and apparatus, to improve decoding performance. Numerous benefits and advantages are achieved by the disclosure over conventional techniques. Embodiments of the disclosure provide methods and apparatuses that improve prediction accuracy in encoding and decoding and increase coding efficiency.

An embodiment of the disclosure provides a video decoding method. The method includes:
parsing a bitstream to obtain a split mode to at least two transform units (TUs) included in a current coding unit (CU), where the split mode is configured to split a coverage area of the current CU into the at least two TUs, there is no overlapping area between the at least two TUs, the at least two TUs each have a serial number, and the serial numbers of the at least two TUs are in a one-to-one correspondence with positions of the at least two TUs in the current CU;
obtaining a transform coefficient of a luminance transform block of a current TU in the at least two TUs;
obtaining a transform type of the luminance transform block of the current TU based on the split mode and a serial number of the current TU, where the transform type includes a horizontal transform type and a vertical transform type;
performing an inverse transform processing on the transform coefficient of the luminance transform block of the current TU based on the transform type of the luminance transform block of the current TU to obtain a reconstructed residual of the luminance transform block of the current TU; and
obtaining a reconstructed block of the current CU based on the reconstructed residual of the luminance transform block of the current TU.

In one embodiment, the split mode is a horizontal binary split, the horizontal binary split is used to horizontally split the coverage area of the current CU into an upper TU and a lower TU, and the upper TU and the lower TU have a same size; a transform type corresponding to a luminance transform block of the upper TU and a transform type corresponding to a luminance transform block of the lower TU have a same horizontal transform type; and a serial number of the upper TU is TU0, and a serial number of the lower TU is TU1; and
obtaining the transform type of the luminance transform block of the current TU based on the split mode and the serial number of the current TU includes:
applying a DCT-8 type as a vertical transform type in the transform type of the luminance transform block of the current TU when the serial number of the current TU is TU0; and/or
applying a DST-7 type as a vertical transform type in the transform type of the luminance transform block of the current TU when the serial number of the current TU is TU1.

In one embodiment, the split mode is horizontal binary split, the horizontal binary split is configured to horizontally split the coverage area of the current CU into an upper TU and a lower TU, and the upper TU and the lower TU have a same size; a transform type corresponding to a luminance transform block of the upper TU and a transform type corresponding to a luminance transform block of the lower TU have a same horizontal transform type; and a serial number of the upper TU is TU0, and a serial number of the lower TU is TU1; and
obtaining the transform type of the luminance transform block of the current TU based on the split mode and the serial number of the current TU includes:
applying a DST-7 type as a vertical transform type in the transform type of the luminance transform block of the current TU when the serial number of the current TU is TU0; or applying a DCT-8 type as a vertical transform type in the transform type of the luminance transform block of the current TU when the serial number of the current TU is TU1.

In one embodiment, the split mode is a vertical binary split, the vertical binary split is configured to horizontally split the coverage area of the current CU into a left TU and a right TU, and the left TU and the right TU have a same size; a transform type corresponding to a luminance transform block of the left TU and a transform type corresponding to a luminance transform block of the right TU have a same vertical transform type; and a serial number of the left TU is TU0, and a serial number of the right TU is TU1; and the obtaining a transform type of the luminance transform block of the current TU based on the split mode and a serial number of the current TU includes:

applying a DCT-8 type as a horizontal transform type in the transform type of the luminance transform block of the current TU when the serial number of the current TU is TU0; or applying a DST-7 type as a horizontal transform type in the transform type of the luminance transform block of the current TU when the serial number of the current TU is TU1.

In one embodiment, the split mode is a vertical binary split, the vertical binary split is configured to horizontally split the coverage area of the current CU into a left TU and a right TU, and the left TU and the right TU have a same size; a transform type corresponding to a luminance transform block of the left TU and a transform type corresponding to a luminance transform block of the right TU have a same vertical transform type; and a serial number of the left TU is TU0, and a serial number of the right TU is TU1; and obtaining the transform type of the luminance transform block of the current TU based on the split mode and the serial number of the current TU includes:

applying a DST-7 type as a horizontal transform type in the transform type of the luminance transform block of the current TU when the serial number of the current TU is TU0; or applying a DCT-8 type as a horizontal transform type in the transform type of the luminance transform block of the current TU when the serial number of the current TU is TU1.

In one embodiment, the split mode is horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and obtaining the transform type of the luminance transform block of the current TU based on the split mode and the serial number of the current TU includes:

applying a DCT-8 type as a vertical transform type in the transform type of the luminance transform block of the current TU when the serial number of the current TU is TU0; and/or applying a DCT-2 type as the vertical transform type in the transform type of the luminance transform block of the current TU when the serial number of the current TU is TU1; and/or applying a DST-7 type as the vertical transform type in the transform type of the luminance transform block of the current TU when the serial number of the current TU is TU2.

In one embodiment, the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and obtaining the transform type of the luminance transform block of the current TU based on the split mode and the serial number of the current TU includes:

applying a DCT-8 type as a vertical transform type in the transform type of the luminance transform block of the current TU when the serial number of the current TU is TU0; and/or applying a DST-7 type as a vertical transform type in the transform type of the luminance transform block of the current TU when the serial number of the current TU is TU1; and/or applying the DST-7 type as the vertical transform type in the transform type of the luminance transform block of the current TU when the serial number of the current TU is TU2.

In one embodiment, the split mode is horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and obtaining the transform type of the luminance transform block of the current TU based on the split mode and the serial number of the current TU includes:

applying a DST-7 type as a vertical transform type in the transform type of the luminance transform block of the current TU when the serial number of the current TU is TU0; and/or applying a DCT-8 type as the vertical transform type in the transform type of the luminance transform block of the current TU when the serial number of the current TU is TU1; and/or applying the DCT-8 type as the vertical transform type in the transform type of the luminance transform block of the current TU when the serial number of the current TU is TU2.

In one embodiment, the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and obtaining the transform type of the luminance transform block of the current TU based on the split mode and the serial number of the current TU includes:

applying a DCT-8 type as a horizontal transform type in the transform type of the luminance transform block of the current TU when the serial number of the current TU is TU0; and/or applying a DCT-2 type as a horizontal transform type in the transform type of the luminance transform block of the current TU when the serial number of the current TU is TU1; and/or applying a DST-7 type as a horizontal transform type in the transform type of the luminance transform block of the current TU when the serial number of the current TU is TU2.

In one embodiment, the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and obtaining the transform type of the luminance transform block of the current TU based on the split mode and the serial number of the current TU includes:

applying a DCT-8 type as a horizontal transform type in the transform type of the luminance transform block of the current TU when the serial number of the current TU is TU0; and/or applying a DST-7 type as the horizontal transform type in the transform type of the luminance transform block of the current TU when the serial number of the current TU is TU1; and/or applying the DST-7 type as the horizontal transform type in the transform type of the luminance transform block of the current TU when the serial number of the current TU is TU2.

In one embodiment, the split mode is a vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and obtaining the transform type of the luminance transform block of the current TU based on the split mode and the serial number of the current TU includes:

applying a DST-7 type as a horizontal transform type in the transform type of the luminance transform block of the current TU when the serial number of the current TU is TU0; and/or applying a DCT-8 type as the horizontal transform type in the transform type of the luminance transform block of the current TU when the serial number of the current TU is TU1; and/or applying the DCT-8 type as the horizontal transform type in the transform type of the luminance transform block of the current TU when the serial number of the current TU is TU2.

In one embodiment, the method further includes:

parsing the bitstream to obtain indication information of the transform type of the luminance transform block of the current TU; where obtaining the transform type of the luminance transform block of the current TU based on the split mode includes:

obtaining the transform type of the luminance transform block of the current TU based on the split mode and the indication information.

In one embodiment, the DCT-8 type is replaced with a DCT-4 type, or the DST-7 type is replaced with a DST-4 type.

An embodiment of the disclosure provides a video decoding apparatus. The apparatus includes:

an entropy decoding unit configured to parse a bitstream to obtain a mode of split to at least two TUs included in a current CU, where the split mode is used to split a coverage area of the current CU into the at least two TUs, there is no overlapping area between the at least two TUs, the at least two TUs each have a serial number, and the serial numbers of the at least two TUs are in a one-to-one correspondence with positions of the at least two TUs in the current CU;

an inverse quantization unit configured to obtain a transform coefficient of a luminance transform block of a current TU in the at least two TUs;

an inverse transform processing unit configured to obtain a transform type of the luminance transform block of the current TU based on the split mode and a serial number of the current TU, where the transform type includes a horizontal transform type and a vertical transform type; and perform inverse transform processing on the transform coefficient of the luminance transform block of the current TU based on the transform type of the luminance transform block of the current TU, to obtain a reconstructed residual of the luminance transform block of the current TU; and a reconstruction unit configured to obtain a reconstructed block of the current CU based on the reconstructed residual of the luminance transform block of the current TU.

In one embodiment, the split mode is a horizontal binary split, the horizontal binary split is configured to horizontally split the coverage area of the current CU into an upper TU and a lower TU, and the upper TU and the lower TU have a same size; a transform type corresponding to a luminance transform block of the upper TU and a transform type corresponding to a luminance transform block of the lower TU have a same horizontal transform type; and a serial number of the upper TU is TU0, and a serial number of the lower TU is TU1; and wherein to obtain the transform type of the luminance transform block of the current TU based on the split mode and the serial number of the current TU, the inverse transform processing unit is configured to:

apply a DCT-8 type as a vertical transform type in the transform type of the luminance transform block of the current TU when the serial number of the current TU is TU0; and/or apply a DST-7 type as a vertical transform type in the transform type of the luminance transform block of the current TU when the serial number of the current TU is TU1.

In one embodiment, the split mode is a horizontal binary split, the horizontal binary split is used to horizontally split the coverage area of the current CU into an upper TU and a lower TU, and the upper TU and the lower TU have a same size; a transform type corresponding to a luminance transform block of the upper TU and a transform type corresponding to a luminance transform block of the lower TU have a same horizontal transform type; and a serial number of the upper TU is TU0, and a serial number of the lower TU is TU1; and wherein to obtain the transform type of the luminance transform block of the current TU based on the split mode and the serial number of the current TU, the inverse transform processing unit is configured to:

apply a DST-7 type as a vertical transform type in the transform type of the luminance transform block of the current TU when the serial number of the current TU is TU0; and/or apply a DCT-8 type as a vertical transform type in the transform type of the luminance transform block of the current TU when the serial number of the current TU is TU1.

In one embodiment, the split mode is a vertical binary split, the vertical binary split is configured to horizontally split the coverage area of the current CU into a left TU and a right TU, and the left TU and the right TU have a same size; a transform type corresponding to a luminance transform block of the left TU and a transform type corresponding to a luminance transform block of the right TU have a same vertical transform type; and a serial number of the left TU is TU0, and a serial number of the right TU is TU1; and wherein to obtain the transform type of the luminance transform block of the current TU based on the split mode and a serial number of the current TU, the inverse transform processing unit is configured to:

apply a DCT-8 type as a horizontal transform type in the transform type of the luminance transform block of the current TU when the serial number of the current TU is TU0; and/or apply a DST-7 type as the horizontal transform type in the transform type of the luminance transform block of the current TU when the serial number of the current TU is TU1.

In one embodiment, the split mode is a vertical binary split, the vertical binary split is configured to horizontally split the coverage area of the current CU into a left TU and a right TU, and the left TU and the right TU have a same size; a transform type corresponding to a luminance transform block of the left TU and a transform type corresponding to a luminance transform block of the right TU have a same vertical transform type; and a serial number of the left TU is TU0, and a serial number of the right TU is TU1; and wherein to obtain the transform type of the luminance transform block of the current TU based on the split mode and a serial number of the current TU, the inverse transform processing unit is configured to:

apply a DST-7 type as a horizontal transform type in the transform type of the luminance transform block of the current TU when the serial number of the current TU is TU0; and/or apply a DCT-8 type as the horizontal transform type in the transform type of the luminance transform block of the current TU when the serial number of the current TU is TU1.

In one embodiment, the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and wherein to obtain the transform type of the luminance transform block of the current TU based on the split mode and the serial number of the current TU, the inverse transform processing unit is configured to:

apply a DCT-8 type as a vertical transform type in the transform type of the luminance transform block of the current TU when the serial number of the current TU is TU0; and/or apply a DCT-2 type as the vertical transform type in the transform type of the luminance transform block of the current TU when the serial number of the current TU is TU1; or apply a DST-7 type as the vertical transform type in the transform type of the luminance transform block of the current TU when the serial number of the current TU is TU2.

In one embodiment, the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and wherein to obtain the transform type of the luminance transform block of the current TU based on the split mode and the serial number of the current TU, the inverse transform processing unit is configured to:

apply a DCT-8 type as a vertical transform type in the transform type of the luminance transform block of the current TU when the serial number of the current TU is TU0; and/or apply a DST-7 type as the vertical transform type in the transform type of the luminance transform block of the current TU when the serial number of the current TU is TU1; and/or apply the DST-7 type as a vertical transform type in the transform type of the luminance transform block of the current TU when the serial number of the current TU is TU2.

In one embodiment, the split mode is a horizontal triple split, the horizontal triple split is used to horizontally split the coverage area of the current CU into an upper TU, a middle TU, and a lower TU, and the upper TU and the lower TU have a same size; a size of the middle TU is twice the size of the upper TU; a transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2; and wherein to obtain the transform type of the luminance transform block of the current TU based on the split mode and a serial number of the current TU, the inverse transform processing unit is configured to:

apply a DST-7 type as a vertical transform type in the transform type of the luminance transform block of the current TU when the serial number of the current TU is TU0; and/or apply a DCT-8 type as the vertical transform type in the transform type of the luminance transform block of the current TU when the serial number of the current TU is TU1; and/or apply the DCT-8 type the vertical transform type in the transform type of the luminance transform block of the current TU when the serial number of the current TU is TU2.

In one embodiment, the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein to obtain the transform type of the luminance transform block of the current TU based on the split mode and a serial number of the current TU, the inverse transform processing unit is configured to:

apply a DCT-8 type as a horizontal transform type in the transform type of the luminance transform block of the current TU when the serial number of the current TU is TU0; and/or apply a DCT-2 type as the horizontal transform type in the transform type of the luminance transform block of the current TU when the serial number of the current TU is TU1; and/or apply a DST-7 type as the horizontal transform type in the transform type of the luminance transform block of the current TU when the serial number of the current TU is TU2.

In one embodiment, the split mode is a vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein to obtain the transform type of the luminance transform block of the current TU based on the split mode and the serial number of the current TU, the inverse transform processing unit is configured to:

apply a DCT-8 type as a horizontal transform type in the transform type of the luminance transform block of the current TU when the serial number of the current TU is TU0; and/or apply a DST-7 type as the horizontal transform type in the transform type of the luminance transform block of the current TU when the serial number of the current TU is TU1; and/or apply the DST-7 type as the horizontal transform type in the transform type of the luminance transform block of the current TU when the serial number of the current TU is TU2.

In one embodiment, the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein to obtain the transform type of the luminance transform block of the current TU based on the split mode and the serial number of the current TU, the inverse transform processing unit is configured to:

apply a DST-7 type as a horizontal transform type in the transform type of the luminance transform block of the current TU when the serial number of the current TU is TU0; and/or apply a DCT-8 type as the horizontal transform type in the transform type of the luminance transform block of the current TU when the serial number of the current TU is TU1; and/or apply the DCT-8 type as the horizontal transform type in the transform type of the luminance transform block of the current TU when the serial number of the current TU is TU2.

In one embodiment, the apparatus is further configured to: parse the bitstream to obtain indication information of the transform type of the luminance transform block of the current TU; where to obtain the transform type of the luminance transform block of the current TU based on the split mode, the apparatus is configured to:

obtain the transform type of the luminance transform block of the current TU based on the split mode and the indication information.

In one embodiment, the DCT-8 type is replaced with a DCT-4 type, or the DST-7 type is replaced with a DST-4 type.

An embodiment of the application provides a decoding device. The decoding device includes a non-volatile memory and a processor coupled to the non-volatile memory configured to store a program code where the processor invokes the program code stored in the memory to execute some or all operations of any method as described herein.

An embodiment of the disclosure provides a computer-readable storage medium, the computer-readable storage medium stores program code, and the program code includes an instruction or a set of instructions configured to perform some or all of the operations of any method as described herein.

An embodiment of the disclosure provides a computer program product executable by a computer, and when the computer program product runs on the computer, the computer performs some or all of the operations of any method as described herein.

It should be understood that, technical solutions in some embodiments of the disclosure are consistent with some other embodiments. Beneficial effects achieved by some embodiments are similar, and details are not described again.

BRIEF DESCRIPTION OF DRAWINGS

To describe the technical solutions in the embodiments of the disclosure or in the background more clearly, the following briefly describes the accompanying drawings required for describing the embodiments of the disclosure or the background.

DESCRIPTION OF EMBODIMENTS

Figure 1A:
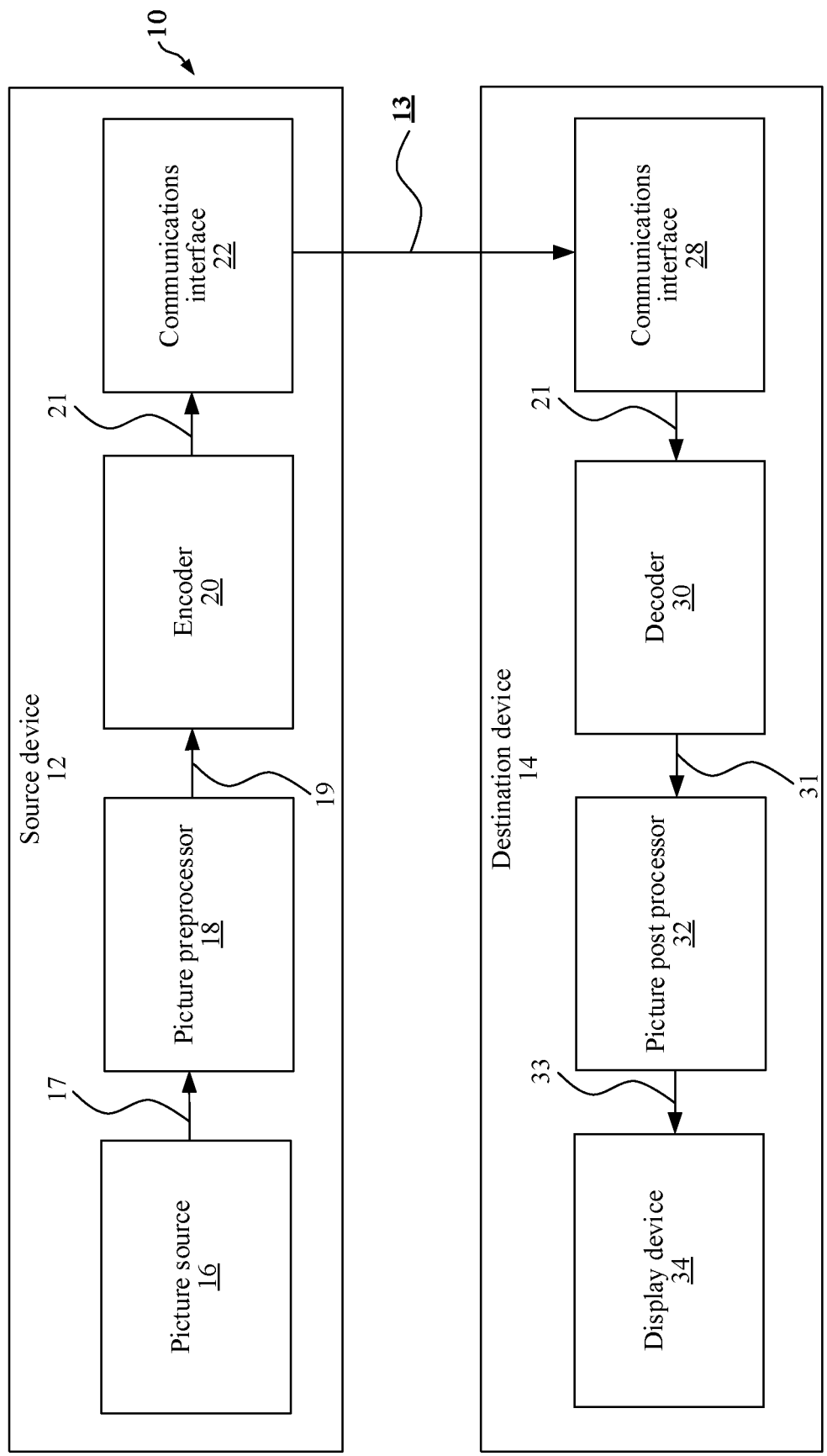
FIG. 1A is a block diagram of an example of a video encoding and decoding system 10 according to an embodiment of the disclosure.

The following describes the embodiments of the disclosure with reference to the accompanying drawings in the embodiments of the disclosure. In the following description, reference is made to the accompanying drawings that form a part of the disclosure and show, by way of illustration, aspects of the embodiments of the disclosure or aspects in which the embodiments of the disclosure may be used. It should be understood that the embodiments of the disclosure may be used in other aspects, and may include structural or logical changes not depicted in the accompanying drawings. Therefore, the following detailed description shall not be construed as limitative, and the scope of the disclosure is defined by the appended claims. For example, it should be understood that disclosed content with reference to a described method may also hold true for a corresponding device or system configured to perform the method, and vice versa. For example, if one or more method operations are described, a corresponding device may include one or more units such as functional units for performing the described one or more method operations (for example, one unit performing the one or more operations; or a plurality of units, each of which performs one or more of the plurality of operations), even if such one or more units are not explicitly described or illustrated in the accompanying drawings. On the other hand, for example, if a device is described based on one or more units such as a functional unit, a corresponding method may include one or more operations used to perform functionality of one or more units (for example, an operation used to perform functionality of one or more units, or a plurality of operations, each of which is used perform functionality of one or more units in a plurality of units), even if such one or a plurality of operations are not explicitly described or illustrated in the accompanying drawings. Further, it should be understood that features of the various example embodiments and/or aspects described in the specification may be combined with each other, unless specifically noted otherwise.

The technical solutions in the embodiments of the disclosure may not only be applied to existing video coding standards (e.g., the H.264 standard and the HEVC standard), but also be applied to future video coding standards (e.g., the H.266 standard). Terms used in the "description of embodiments" part of the disclosure are merely intended to explain embodiments of the disclosure, but are not intended to limit the disclosure. In the following, some concepts that may be used in the embodiments of the disclosure are first described briefly.

Video coding usually refers to processing a sequence of pictures that form a video or a video sequence. In the field of video coding, the terms "picture", "frame", or "image" can be used as synonymous terms. Video coding used in the specification indicates video encoding or video decoding. Video encoding is performed at a source side, and usually includes processing (for example, through compression) original video pictures to reduce an amount of data required for representing the video pictures, for more efficient storage and/or transmission. Video decoding is performed at a destination side, and usually includes inverse processing relative to an encoder, to reconstruct video pictures. Video picture "coding" in the embodiments shall be understood as "encoding" or "decoding" for a video sequence. A combination of an encoding part and a decoding part is also referred to as codec (encoding and decoding).

A video sequence includes a series of images (e.g., pictures), the image is further split into slices, and a slice is further split into blocks. In video coding, coding processing is performed per block. In some new video coding standards, a concept of block is further extended. For example, in the H.264 standard, there is a macro block (MB), and the macro block may be further split into a plurality of partitions that can be used for predictive coding. In the high efficiency video coding (HEVC) standard, basic concepts such as a coding unit (CU), a prediction unit (PU), and a transform unit (TU) are used, so that a plurality of types of block units are obtained through functional division, and the units are described with reference to a new tree-based structure. For example, a CU may be split into smaller CUs based on a quad-tree, and the smaller CU may continue to be split, thereby forming a quad-tree structure, and the CU is a basic unit for splitting and coding a to-be coded image. The PU and the TU also have a similar tree structure, and the PU may correspond to a prediction block and is a basic unit of predictive coding. The CU is further split into a plurality of PUs based on a split mode. The TU may correspond to a transform block, and is a basic unit for transforming a prediction residual. Generally, all of the CU, the PU, and the TU are concepts of blocks (or referred to as image blocks).

For example, in HEVC, a coding tree unit (CTU) is divided into a plurality of CUs by using a quad-tree structure represented as a coding tree. A size of a CTU may be set to 64×64, 1280×128, 256×256, or the like. For example, a 64×64 CTU includes a rectangular matrix with 64 columns and 64 pixels per column. A pixel may include only a luminance component, or may include a luminance component (referred to as Y) and two chrominance components (referred to as Cb and Cr). A luminance component of a pixel is referred to as a luminance pixel, and a chrominance component of a pixel is referred to as a chrominance pixel. A decision on whether to code a picture area by using inter-picture (temporal) or intra-picture (spatial) prediction is made at a CU level. Each CU may be further split into one, two, or four PUs based on a PU division type. Within one PU, a same prediction process is applied, and related information is transmitted to a decoder on a PU basis. After a residual block is obtained by applying the prediction process based on the PU division type, the CU may be partitioned into transform units (TUs) based on another quad-tree structure similar to the coding tree used for the CU. In the recent development of video compression technologies, a quad-tree and binary-tree (QTBT) partition frame is used to partition an encoded block. In a QTBT block structure, a CU may have a square or rectangular shape.

In the specification, for ease of description and understanding, an image block to be coded in a current to-be coded image may be referred to as a current block. For example, in encoding, the current block is a block currently being encoded, and in decoding, the current block is a block currently being decoded. A decoded image block, in a reference picture, used for predicting the current block is referred to as a reference block. In other words, the reference block is a block that provides a reference signal for the current block, where the reference signal indicates a pixel value in the image block. A block that provides a prediction signal for the current block in the reference image may be referred to as a prediction block, and the prediction signal indicates a pixel value, a sampling value, or a sampling signal in the prediction block. For example, after a plurality of reference blocks are traversed, an optimal reference block is found, and the optimal reference block provides prediction for the current block, and this block is referred to as a prediction block.

In a case of lossless video coding, original video pictures can be reconstructed, which means reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed at a decoder side, which means quality of reconstructed video pictures is lower or poorer than that of the original video pictures.

Several H.261 video coding standards are for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, at an encoder side, a video is usually processed, that is, encoded, at a block (video block) level. For example, a prediction block is generated through spatial (intra-picture) prediction and temporal (inter-picture) prediction, the prediction block is subtracted from a current block (block currently being processed or to be processed) to obtain a residual block, and the residual block is transformed and quantized in the transform domain, to reduce an amount of data that is to be transmitted (compressed). At a decoder side, an inverse processing part relative to the encoder is applied to the encoded or compressed block to reconstruct the current block for representation. Furthermore, the encoder duplicates a decoder processing loop, so that the encoder and the decoder generate same predictions (for example, intra predictions and inter predictions) and/or reconstruction, for processing, that is, for coding subsequent blocks.

The following describes a system architecture to which the embodiments of the disclosure are applied. FIG. 1A is a schematic block diagram of an example of a video encoding and decoding system 10 according to an embodiment of the disclosure. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a RAM, a ROM, an EEPROM, a flash memory, or any other medium that can be used to store required program code in a form of an instruction or a data structure accessible by a computer, as described in the specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive encoded video data from the source device 12 through the link 13. The link 13 may include one or more media or apparatuses capable of moving the encoded video data from the source device 12 to the destination device 14. In one example, the link 13 may include one or more communication media that enable the source device 12 to transmit the encoded video data directly to the destination device 14 in real time. In this example, the source device 12 may modulate the encoded video data according to a communications standard (for example, a wireless communications protocol), and may transmit the modulated video data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the Internet). The one or more communication media may include a router, a switch, a base station, or another device that facilitates communication from the source device 12 to the destination device 14.

The source device 12 includes an encoder 20, and In one embodiment, the source device 12 may further include a picture source 16, a picture preprocessor 18, and a communications interface 22. In an embodiment, the encoder 20, the picture source 16, the picture preprocessor 18, and the communications interface 22 may be hardware components in the source device 12, or may be software programs in the source device 12. Separate descriptions are as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface for storing a previously captured or generated picture and/or for obtaining or receiving a picture. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be regarded as a two-dimensional array or matrix of pixels (picture elements). A pixel in the array may also be referred to as a sample. A quantity of samples in horizontal and vertical directions (or axes) of the array or the picture defines a size and/or resolution of the picture. For representation of color, three color components are usually used, for example, the picture may be represented as or include three sample arrays. For example, in an RGB format or color space, a picture includes corresponding red, green, and blue sample arrays. However, in video coding, each pixel is usually represented in a luminance/chrominance format or color space, for example, a picture in a YUV format includes a luminance component denoted as Y (denoted as L alternatively) and two chrominance components denoted as U and V. The luminance (luma) component Y represents luminance or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). Pictures in the RGB format may be transformed or converted to pictures in the YUV format and vice versa. This process is also referred to as color conversion or transform. If a picture is monochrome, the picture may include only a luminance sample array. In an embodiment, a picture transmitted by the picture source 16 to the picture preprocessor 18 may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from the RGB format to the YUV format), color correction, or denoising.

The encoder 20 (also referred to as a video encoder 20) is configured to receive the preprocessed picture data 19, and process the preprocessed picture data 19 by using a related prediction mode (such as a prediction mode in an embodiment of the specification), to provide encoded picture data 21 (structural details of the encoder 20 are further described below with reference to FIG. 2, FIG. 4, or FIG. 5). In some embodiments, the encoder 20 may be configured to perform various embodiments described below, to implement encoder-side application of a chrominance transform block prediction method described in the disclosure.

The communications interface 22 may be configured to receive the encoded picture data 21, and transmit the encoded picture data 21 to the destination device 14 or any other device (for example, a memory) through the link 13 for storage or direct reconstruction. The any other device may be any device configured for decoding or storage. The communications interface 22 may be, for example, configured to encapsulate the encoded picture data 21 into an appropriate format, for example, a data packet, for transmission over the link 13.

The destination device 14 includes a decoder 30, and in one embodiment, the destination device 14 may further include a communications interface 28, a picture post processor 32, and a display device 34. Separate descriptions are as follows:

The communications interface 28 may be configured to receive the encoded picture data 21 from the source device 12 or any other source. The any other source may be, for example, a storage device, and the storage device may be, for example, an encoded picture data storage device. The communications interface 28 may be configured to transmit or receive the encoded picture data 21 through the link 13 between the source device 12 and the destination device 14 or through any type of network. The link 13 may be, for example, a direct wired or wireless connection, and the any type of network may be, for example, a wired or wireless network or any combination thereof, or any type of private or public network, or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (also referred to as the video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a chrominance transform block prediction method described in the disclosure.

The picture post processor 32 is configured to postprocess the decoded picture data 31 (also referred to as reconstructed picture data) to obtain post-processed picture data 33. The post-processing performed by the picture post processor 32 may include color format conversion (for example, from a YUV format to an RGB format), color correction, trimming, re-sampling, or any other processing. The picture post processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of the different units or functionalities of the source device 12 and/or the destination device 14 shown in FIG. 1A may vary with an actual device and application. The source device 12 and the destination device 14 may include any of a wide variety of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may not use or may use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combinations thereof. If the techniques are implemented partially by using software, a device may store a software instruction in a suitable and non-transitory computer-readable storage medium and may execute the instruction by using hardware such as one or more processors, to perform the techniques of the disclosure. Any of the foregoing (including hardware, software, a combination of hardware and software, and the like) may be considered as one or more processors.

In some cases, the video encoding and decoding system 10 shown in FIG. 1A is merely an example and the techniques of the disclosure may be applied to video coding settings (for example, video encoding or video decoding) that do not necessarily include any data communication between an encoding device and a decoding device. In other examples, data may be retrieved from a local memory, streamed over a network, or the like. A video encoding device may encode the data and store the data into a memory, and/or a video decoding device may retrieve the data from the memory and decode the data. In some examples, encoding and decoding are performed by devices that do not communicate with each other but simply encode data to a memory and/or retrieve the data from the memory and decode the data.

Figure 1B:
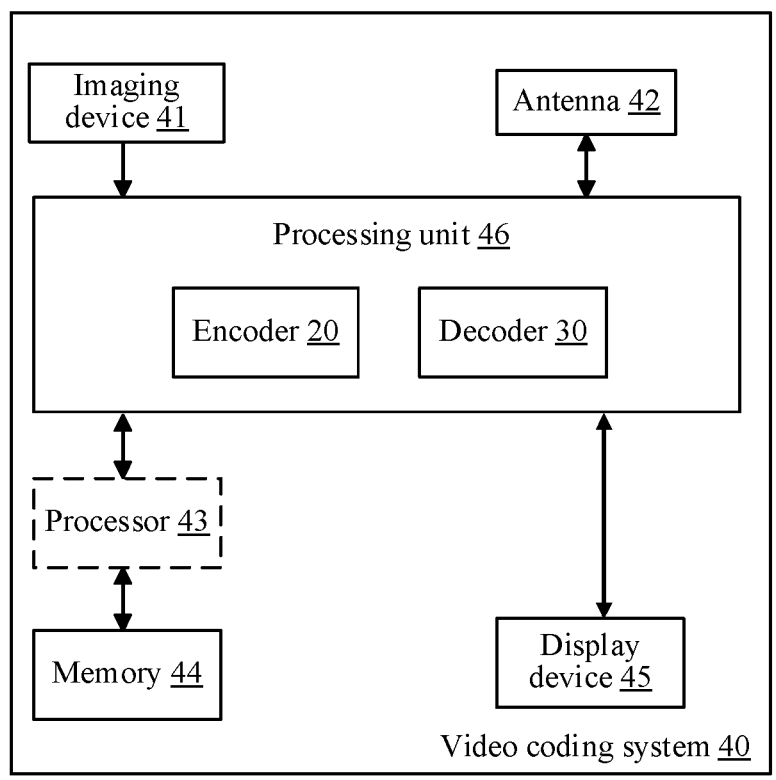
FIG. 1B is a block diagram of an example of a video coding system 40 according to an embodiment of the disclosure.
Figure 2:
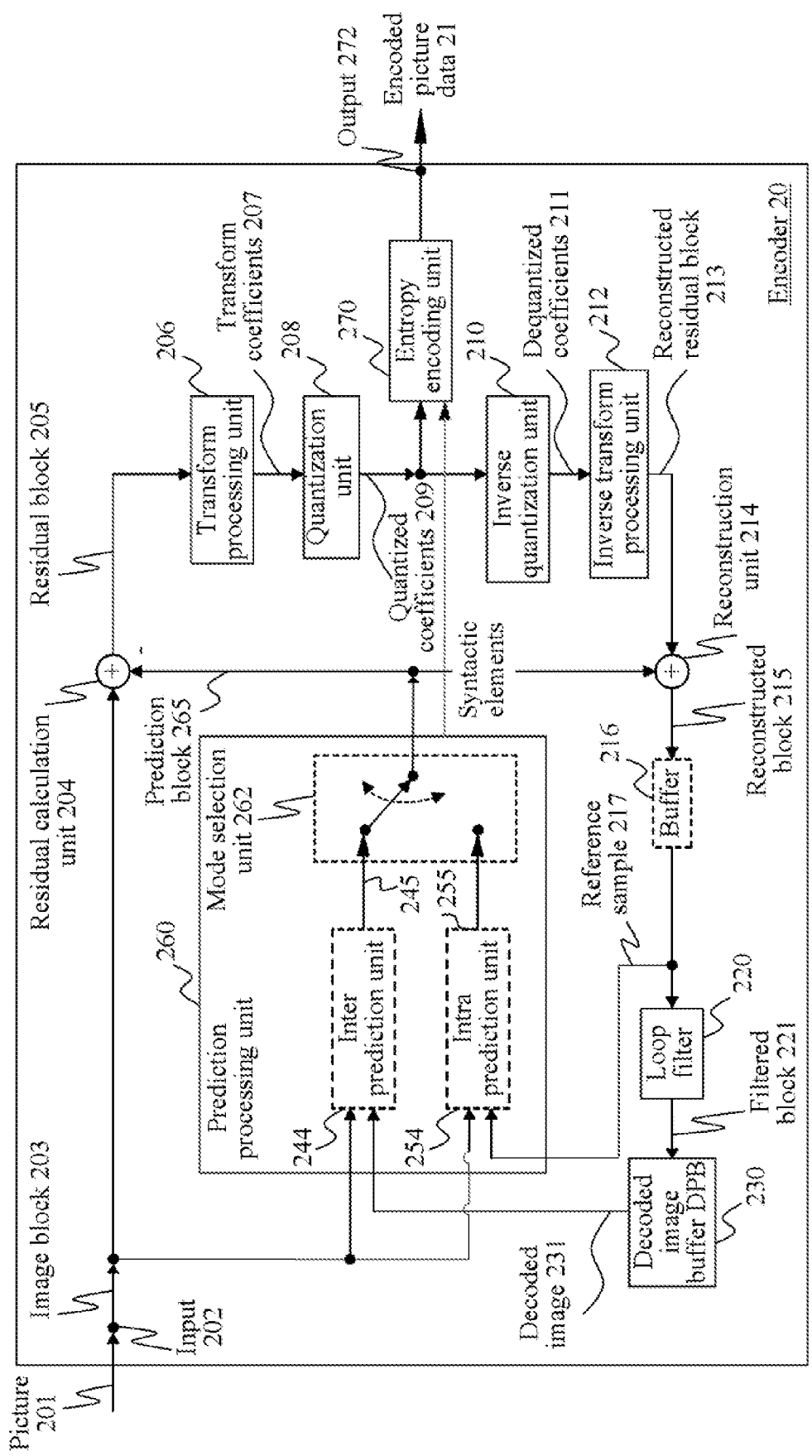
FIG. 2 is a block diagram of an example structure of an encoder 20 according to an embodiment of the disclosure.
Figure 3:
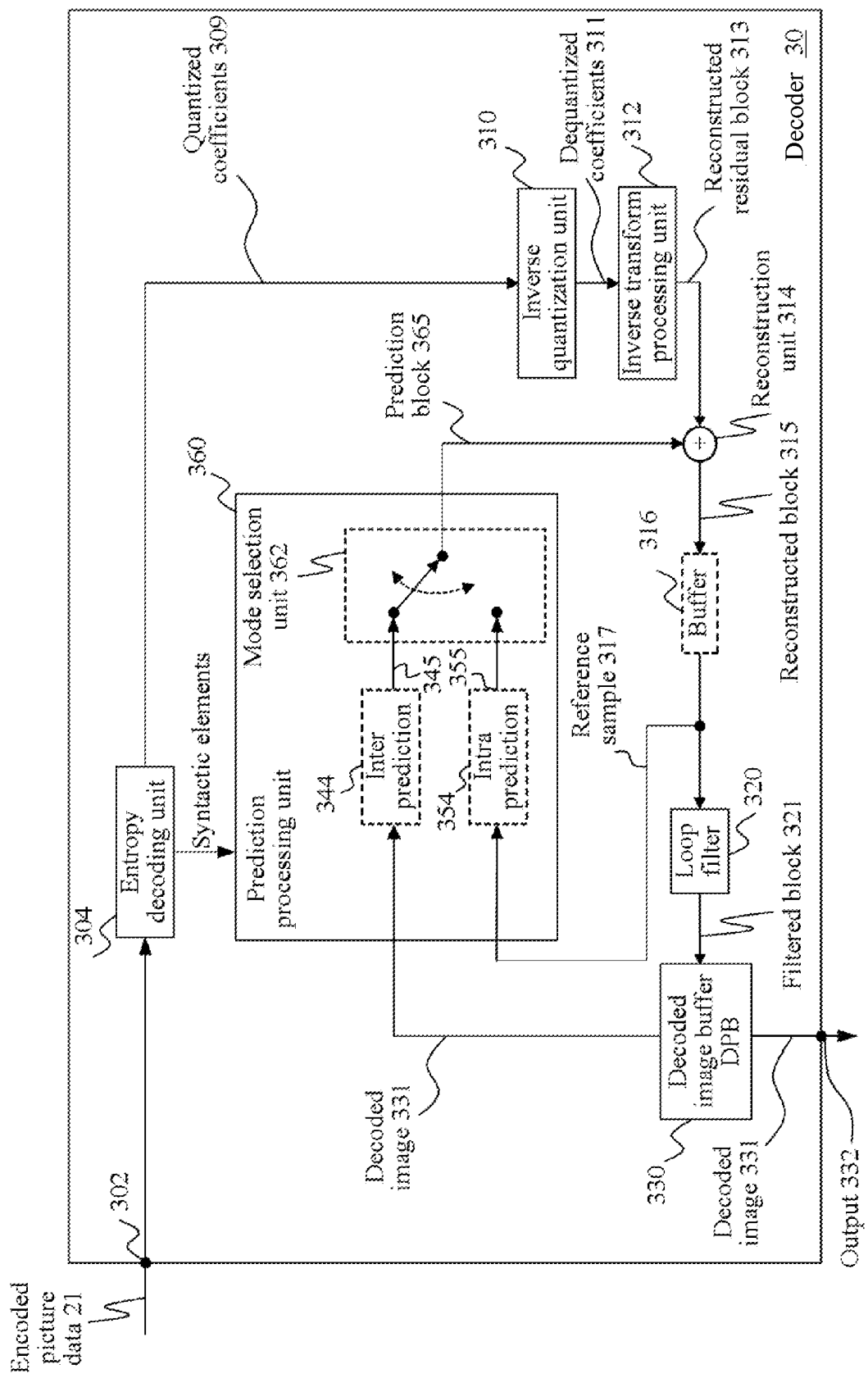
FIG. 3 is a block diagram of an example structure of a decoder 30 according to an embodiment of the disclosure.

FIG. 1B is an illustrative diagram of an example of a video coding system 40 including an encoder 20 in FIG. 2 and/or an decoder 30 in FIG. 3 according to an example embodiment. The video coding system 40 can implement a combination of various techniques in the embodiments of the disclosure. In the illustrated embodiment, the video coding system 40 may include an imaging device 41, the encoder 20, the decoder 30 (and/or a video encoder/decoder implemented by a logic circuit of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 (not shown) may be implemented by the processing unit 46. The processing unit 46 may include an application-specific integrated circuit (ASIC) logic, a graphics processor, a general purpose processor, or the like. The video coding system 40 may also include an optional processor 43. The optional processor 43 may similarly include an application-specific integrated circuit (ASIC) logic, a graphics processor, a general purpose processor, or the like. In some examples, the logic circuit 47 may be implemented by hardware, for example, video coding dedicated hardware, and the processor 43 may be implemented by general purpose software, an operating system, or the like. In addition, the memory 44 may be any type of memory, for example, a volatile memory (for example, a static random access memory (SRAM) or a dynamic random access memory (DRAM)) or a non-volatile memory (for example, a flash memory). In a non-limiting example, the memory 44 may be implemented by a cache memory. In some examples, the logic circuit 47 may access the memory 44 (for example, for an embodiment of an image buffer). In other examples, the logic circuit 47 and/or the processing unit 46 may include a memory (for example, a cache) for an embodiment of an image buffer or the like.

In some examples, the encoder 20 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the encoder 20 implemented by the logic circuit 47, to implement various modules that are described with reference to FIG. 2 and/or any other encoder system or subsystem described in the specification. The logic circuit may be configured to perform various operations described in the specification.

In some examples, the decoder 30 may be implemented by the logic circuit 47 in a similar manner, to implement various modules that are described with reference to the decoder 30 in FIG. 3 and/or any other decoder system or subsystem described in the specification. In some examples, the decoder 30 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the decoder 30 implemented by the logic circuit 47, to implement various modules that are described with reference to FIG. 3 and/or any other decoder system or subsystem described in the specification.

In some examples, the antenna 42 may be configured to receive an encoded bitstream of video data. As described, the encoded bitstream may include data, an indicator, an index value, mode selection data, or the like related to video frame encoding described in the specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that in an embodiment, for the example described with regard to the encoder 20, the decoder 30 may be configured to perform a reverse process. With regard to signaling syntactic elements, the decoder 30 may be configured to receive and parse such syntactic elements and correspondingly decode related video data. In some examples, the encoder 20 may entropy encode the syntactic elements into an encoded video bitstream. In such examples, the decoder 30 may parse such syntactic elements and correspondingly decode related video data.

In an embodiment, the encoder 20 and the decoder 30 may be an encoder and a decoder corresponding to a video standard protocol such as H.263, H.264, HEVC, MPEG-2, MPEG-4, VP8, and VP9 or a next generation video standard protocol (such as H.266).

FIG. 2 is a schematic/conceptual block diagram of an example of an encoder 20 according to an embodiment of the disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the diagram). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a reverse signal path of the encoder, where the reverse signal path of the encoder corresponds to a signal path of a decoder (refer to a decoder 30 in FIG. 3).

The encoder 20 receives, for example, by using an input 202, a picture 201 or an image block 203 of the picture 201, for example, a picture in a sequence of pictures forming a video or a video sequence. The image block 203 may also be referred to as a current picture block or a to-be-encoded picture block, and the picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

An embodiment of the encoder 20 may include a partitioning unit (not depicted in FIG. 2), configured to partition the picture 201 into a plurality of blocks such as the image block 203. The picture 201 is usually partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In one example, the prediction processing unit 260 of the encoder 20 may be configured to perform any combination of the partitioning techniques described above.

Like the picture 201, the image block 203 is also or may be considered as a two-dimensional array or matrix of samples with sample values, although of a smaller size than the picture 201. In other words, the image block 203 may include, for example, one sample array (for example, a luminance array in a case of a monochrome picture 201), three sample arrays (for example, one luminance array and two chrominance arrays in a case of a color picture), or any other quantity and/or type of arrays depending on an applied color format. A quantity of samples in horizontal and vertical directions (or axes) of the image block 203 defines a size of the image block 203.

The encoder 20 shown in FIG. 2 is configured to encode the picture 201 block by block, for example, perform encoding and prediction on each image block 203.

The residual calculation unit 204 is configured to calculate a residual block 205 based on the image block 203 and a prediction block 265 (further details about the prediction block 265 are provided below), for example, obtain the residual block 205 in a sample domain by subtracting sample values of the prediction block 265 from sample values of the image block 203 sample by sample (pixel by pixel).

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled by a factor. In order to preserve a norm of a residual block which is processed by using forward and inverse transforms, applying an additional scale factor is a part of a transform process. The scale factor is usually chosen based on some constraints, for example, the scale factor is a power of two for a shift operation, a bit depth of the transform coefficient, or a tradeoff between accuracy and implementation costs. For example, a specific scale factor is specified for the inverse transform at the decoder 30 side by, for example, an inverse transform processing unit 312 (and a corresponding inverse transform at the encoder 20 side by, for example, the inverse transform processing unit 212), and correspondingly, a corresponding scale factor may be specified for the forward transform at the side of the encoder 20 by the transform processing unit 206.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, whereas a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), and vice versa. The quantization may include division by a quantization step and corresponding quantization or dequantization, for example, performed by the inverse quantization unit 210, or may include multiplication by a quantization step. Embodiments according to some standards such as HEVC may use a quantization parameter to determine the quantization step. Generally, the quantization step may be calculated based on a quantization parameter by using a fixed point approximation of an equation including division. Additional scale factors may be introduced for quantization and dequantization, to restore the norm that is of the residual block and that may be modified because of a scale used in the fixed point approximation of the equation for the quantization step and the quantization parameter. In one embodiment, a scale of the inverse transform may be combined with a scale of dequantization. Alternatively, customized quantization tables may be used and signaled from an encoder to a decoder, for example, in a bitstream. The quantization is a lossy operation, where a larger quantization step indicates a larger loss.

The inverse quantization unit 210 is configured to apply the inverse quantization of the quantization unit 208 to quantized coefficients to obtain dequantized coefficients 211, for example, apply, based on or by using a same quantization step as the quantization unit 208, the inverse of a quantization scheme applied by the quantization unit 208. The dequantized coefficients 211 may also be referred to as dequantized residual coefficients 211, and correspond, although usually different from the transform coefficients due to a loss caused by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, the reconstructed residual block 213) to the prediction block 265 to obtain a reconstructed block 215 in the sample domain, for example, by adding sample values of the reconstructed residual block 213 and the sample values of the prediction block 265.

In one embodiment, a buffer unit 216 (or "buffer" 216) of, for example, the line buffer 216, is configured to buffer or store the reconstructed block 215 and corresponding sample values, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, an embodiment of the encoder 20 may be configured so that the buffer unit 216 is not only used for storing the reconstructed block 215 for intra prediction 254 but also used for the loop filter unit 220, and/or so that, for example, the buffer unit 216 and the decoded picture buffer unit 230 form one buffer. In other embodiments, filtered blocks 221 and/or blocks or samples from the decoded picture buffer 230 (the blocks or samples are not shown in FIG. 2) are used as an input or a basis for intra prediction 254.

The loop filter unit 220 (or "loop filter" 220) is configured to filter the reconstructed block 215 to obtain a filtered block 221, to smooth pixel transitions or improve video quality. The loop filter unit 220 is intended to represent one or more loop filters including a de-blocking filter, a sample-adaptive offset (SAO) filter, and other filters, for example, a bilateral filter, an adaptive loop filter (ALF), a sharpening or smoothing filter, or a collaborative filter. Although the loop filter unit 220 is shown in FIG. 2 as an in loop filter, in other configurations, the loop filter unit 220 may be implemented as a post loop filter. The filtered block 221 may also be referred to as a filtered reconstructed block 221. The decoded picture buffer 230 may store the reconstructed encoded blocks after the loop filter unit 220 performs filtering operations on the reconstructed encoded blocks.

An embodiment of the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The decoded picture buffer (DPB) 230 may be a reference picture memory that stores reference picture data for use in video data encoding by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, a reference sample 217 of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

An embodiment of the mode selection unit 262 may be configured to select the prediction mode (for example, from prediction modes supported by the prediction processing unit 260), where the prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion at least satisfies a prediction mode selection criterion.

In the following, prediction processing performed (for example, by using the prediction processing unit 260) and mode selection performed (for example, by using the mode selection unit 262) by an example of the encoder 20 are described in more detail.

As described above, the encoder 20 is configured to determine or select the optimal or optimum prediction mode from a set of (pre-determined) prediction modes. The set of prediction modes may include, for example, intra prediction modes and/or inter prediction modes.

A set of intra prediction modes may include 35 different intra prediction modes, for example, non-directional modes such as a DC (or mean) mode and a planar mode, or directional modes such as those defined in H.265, or may include 67 different intra prediction modes, for example, non-directional modes such as a DC (or mean) mode and a planar mode, or directional modes such as those defined in H.266 under development.

In an embodiment, a set of inter prediction modes depends on available reference pictures (that is, for example, at least partially decoded pictures stored in the DPB 230, as described above) and other inter prediction parameters, for example, depends on whether the entire reference picture or only a part of the reference picture, for example, a search window area around an area of the current block, is used for searching for an optimal matching reference block, and/or for example, depends on whether pixel interpolation such as half-pel and/or quarter-pel interpolation is applied. The set of inter prediction modes may include, for example, an advanced motion vector prediction (AMVP) mode and a merge mode. In some embodiments, the set of inter prediction modes may include a control point—based AMVP mode and a control point—based merge mode that are improved in the embodiments of the disclosure. In one example, the intra prediction unit 254 may be configured to perform any combination of intra prediction techniques described below.

In addition to the foregoing prediction modes, a skip mode and/or a direct mode may also be applied in the embodiments of the disclosure.

The prediction processing unit 260 may be further configured to partition the image block 203 into smaller block partitions or sub-blocks, for example, by iteratively using quad-tree (QT) partitioning, binary-tree (BT) partitioning, triple-tree (TT) partitioning, or any combination thereof, and to perform, for example, prediction on each of the block partitions or sub-blocks, where mode selection includes selection of a tree structure of the partitioned image block 203 and selection of a prediction mode applied to each of the block partitions or sub-blocks.

The inter prediction unit 244 may include a motion estimation (ME) unit (not shown in FIG. 2) and a motion compensation (MC) unit (not shown in FIG. 2). The motion estimation unit is configured to receive or obtain the image block 203 (the current image block 203 of the current picture 201) and a decoded picture 231, or at least one or more previously reconstructed blocks, for example, reconstructed blocks of one or more other/different previously decoded pictures 231, for motion estimation. For example, a video sequence may include the current picture and the previously decoded pictures 231, or in other words, the current picture and the previously decoded pictures 231 may be a part of or form a sequence of pictures forming a video sequence.

For example, the encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a position (coordinates X and Y) of the reference block and a position of the current block as an inter-prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolations for sub-pixel precision). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate syntactic elements associated with blocks and video slices, for use by the decoder 30 in decoding picture blocks of the video slice.

In some embodiments, the inter prediction unit 244 may transmit the syntactic elements to the entropy encoding unit 270, and the syntactic elements include the inter prediction parameter (such as indication information of selection of an inter prediction mode used for prediction of the current block after traversal of a plurality of inter prediction modes). In a possible application scenario, if there is only one inter prediction mode, the inter prediction parameter may be alternatively not carried in the syntactic elements. In this case, the decoder side 30 may perform decoding directly in a default prediction mode. It can be understood that the inter prediction unit 244 may be configured to perform any combination of inter prediction techniques.

The intra prediction unit 254 is configured to obtain, for example, receive, the picture block 203 (the current picture block) and one or more previously reconstructed blocks, for example, reconstructed neighboring blocks, of the same picture for intra estimation. The encoder 20 may be, for example, configured to select an intra prediction mode from a plurality of (predetermined) intra prediction modes.

An embodiment of the encoder 20 may be configured to select the intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting an intra prediction mode for a block, the intra prediction unit 254 is further configured to provide the intra prediction parameter, that is, information indicating the selected intra prediction mode for the block, to the entropy encoding unit 270. In one example, the intra prediction unit 254 may be configured to perform any combination of intra prediction techniques.

Specifically, the intra prediction unit 254 may transmit the syntactic elements to the entropy encoding unit 270, and the syntactic elements include the intra prediction parameter (such as indication information of selection of an intra prediction mode used for prediction of the current block after traversal of a plurality of intra prediction modes). In a possible application scenario, if there is only one intra prediction mode, the intra prediction parameter may be alternatively not carried in the syntactic elements. In this case, the decoder side 30 may perform decoding directly in a default prediction mode.

The entropy encoding unit 270 is configured to apply an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding method or technique to the quantized residual coefficients 209, the inter prediction parameter, the intra prediction parameter, and/or the loop filter parameter individually or jointly (or not at all) to obtain encoded picture data 21 that can be output by an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode other syntactic elements for a current video slice being encoded.

Other structural variations of the video encoder 20 can be used to encode a video stream. For example, a non-transform based encoder 20 may quantize a residual signal directly without the transform processing unit 206 for some blocks or frames. In another embodiment, the encoder 20 may have the quantization unit 208 and the inverse quantization unit 210 combined into a single unit.

In some embodiments, the encoder 20 can be configured to implement a video encoding method described below.

It should be understood that other structural variations of the video encoder 20 can be used to encode a video stream. For example, for some image blocks or image frames, the video encoder 20 may quantize the residual signal directly without processing by the transform processing unit 206, and correspondingly, without processing by the inverse transform processing unit 212. Alternatively, for some image blocks or image frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed image block as a reference block, without processing by the filter 220. Alternatively, the quantization unit 208 and the inverse quantization unit 210 in the video encoder 20 may be combined together. The loop filter 220 is optional, and in a case of lossless compression encoding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be used selectively.

FIG. 3 is a schematic/conceptual block diagram of an example of a decoder 30 according to an embodiment of the disclosure. The video decoder 30 is configured to receive 302 encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and associated syntactic elements.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, quantized coefficients 309 and/or decoded encoding parameters (not shown in FIG. 3), for example, any one or all of an inter prediction parameter, an intra prediction parameter, a loop filter parameter, and/or other syntactic elements (that are decoded). The entropy decoding unit 304 is further configured to forward the inter prediction parameter, the intra prediction parameter, and/or the other syntactic elements to the prediction processing unit 360. The video decoder 30 may receive syntactic elements at a video slice level and/or a video block level.

The inverse quantization unit 310 may have a same function as the inverse quantization unit 210, the inverse transform processing unit 312 may have a same function as the inverse transform processing unit 212, the reconstruction unit 314 may have a same function as the reconstruction unit 214, the buffer 316 may have a same function as the buffer 216, the loop filter 320 may have a same function as the loop filter 220, and the decoded picture buffer 330 may have a same function as the decoded picture buffer 230.

The prediction processing unit 360 may include the inter prediction unit 344 and the intra prediction unit 354, where the inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) prediction-related parameters and/or information about a selected prediction mode, for example, from the entropy decoding unit 304.

When the video slice is encoded as an intra-encoded (I) slice, the intra prediction unit 354 of the prediction processing unit 360 is configured to generate the prediction block 365 for a picture block of the current video slice based on a signaled intra prediction mode and data that is from previously decoded blocks of a current frame or picture. In an embodiment, the prediction block 265 may be an inter prediction block 345 or an intra prediction block 355.

When the video frame is encoded as an inter-encoded (that is, B or P) slice, the inter prediction unit 344 (for example, a motion compensation unit) of the prediction processing unit 360 is configured to generate the prediction block 365 for a video block of the current video slice based on a motion vector and other syntactic elements received from the entropy decoding unit 304. For inter prediction, the prediction block may be generated from one of reference pictures in one reference picture list. The video decoder 30 may construct reference frame lists, a list 0 and a list 1, by using a default construction technique based on reference pictures stored in the DPB 330.

The prediction processing unit 360 is configured to determine prediction information for a video block of the current video slice by parsing the motion vector and the other syntactic elements, and use the prediction information to generate the prediction block for the current video block being decoded. In one example, the prediction processing unit 360 uses some of the received syntactic elements to determine a prediction mode (for example, intra or inter prediction) used for encoding video blocks of the video slice, an inter prediction slice type (for example, a B slice, a P slice, or a GPB slice), construction information for one or more of the reference picture lists for the slice, a motion vector for each inter-encoded video block of the slice, an inter prediction status for each inter-encoded video block of the slice, and other information, to decode the video blocks in the current video slice. In another embodiment, the syntactic elements received by the video decoder 30 from a bitstream include syntactic elements in one or more of an adaptive parameter set (APS), a sequence parameter set (SPS), a picture parameter set (PPS), or a slice header.

The inverse quantization unit 310 may be configured to inverse quantize (that is, de-quantize) quantized transform coefficients 311 provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to the transform coefficients to generate residual blocks in a pixel domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding sample values of the reconstructed residual block 313 and sample values of the prediction block 365.

The loop filter unit 320 (in a coding loop or after a coding loop) is configured to filter the reconstructed block 315 to obtain a filtered block 321, to smooth pixel transitions or improve video quality. In one example, the loop filter unit 320 may be configured to perform any combination of filtering techniques described below. The loop filter unit 320 may be one or more loop filters including a de-blocking filter, a sample-adaptive offset (sample-adaptive offset, SAO) filter, and other filters, for example, a bilateral filter, an adaptive loop filter (adaptive loop filter, ALF), a sharpening or smoothing filter, or a collaborative filter. Although the loop filter unit 320 is shown in FIG. 3 as an in-loop filter, in other configurations, the loop filter unit 320 may be implemented as a post-loop filter.

The decoded video blocks 321 in a given frame or picture are then stored in the decoded picture buffer 330 that stores reference pictures used for subsequent motion compensation.

The decoder 30 is configured to, for example, output the decoded picture 31 by using an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another embodiment, the video decoder 30 may have the inverse quantization unit 310 and the inverse transform processing unit 312 combined into a single unit.

In some embodiments, the decoder 30 is configured to implement a video decoding method described below.

It should be understood that other structural variations of the video decoder 30 can be used to decode an encoded video bitstream. For example, the video decoder 30 may generate an output video stream without processing by the filter 320. Alternatively, for some image blocks or image frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional, and in a case of lossless compression, the inverse quantization unit 310 and the inverse transform processing unit 312 are optional. It should be understood that in different application scenarios, the inter prediction unit and the intra prediction unit may be used selectively.

It should be understood that on the encoder 20 and the decoder 30 in the disclosure, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current image block or a motion vector of a sub-block of the current image block derived from a motion vector of a neighboring affine coded block may be further processed. This is not limited in the disclosure. For example, a value range of the motion vector is restricted to be within a specific bit depth. Assuming that an allowed bit depth of a motion vector is bitDepth, a motion vector range is from $-2^{(bitDepth-1)}$ to $2^{(bitDepth-1)}-1$, where the symbol "^" represents a power. If bitDepth is 16, a value range is from −32768 to 32767. If bitDepth is 18, a value range is from −131072 to 131071. For another example, values of motion vectors (for example, motion vectors MV of four 4×4 sub-blocks in an 8×8 image block) are restricted, so that a maximum difference between integer parts of the MVs of the four 4×4 sub-blocks does not exceed N pixels, for example, does not exceed one pixel.

The following two approaches or technical solutions may be used to restrict the motion vector to be within a specific bit width.

Approach 1: An overflowing high-order bit of a motion vector is removed:

$$ux=(vx+2^{bitDepth})\% \ 2^{bitDepth}$$

$$vx=(ux>=2^{bitDepth-1})?(ux-2^{bitDepth}):ux$$

$$uy=(vy 2^{bitDepth})\% \ 2^{bitDepth}$$

$$vy=(uy>=2^{bitDepth-1})?(uy-2^{bitDepth}):uy$$

where vx is a horizontal component of the motion vector of the image block or the sub-block of the image block, vy is a vertical component of the motion vector of the image block or the sub-block of the image block, and ux and uy are intermediate values, and bitDepth represents a bit depth.

For example, a value of vx is −32769, and 32767 is obtained by using the foregoing formulas. A value is stored in a computer in a two's complement form, a two's complement of −32769 is 1,0111,1111,1111,1111 (17 bits), and processing performed by the computer for overflowing is discarding a high-order bit. Therefore, a value of vx is 0111,1111,1111,1111, that is, 32767, which is consistent with the result obtained through processing by using the formulas.

Approach 2: Clipping is performed on a motion vector, as shown in the following formulas:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where vx is a horizontal component of the motion vector of the image block or the sub-block of the image block, and vy is a vertical component of the motion vector of the image block or the sub-block of the image block; and x, y, and z are respectively corresponding to three input values of an MV clamping process Clip3, and Clip3 is defined to indicate clipping a value of z on a range [x, y]:

$$\text{Clip3}(x, y, z) = \begin{cases} x & ; \ z < x \\ y & ; \ z > y \\ z & ; \ \text{otherwise} \end{cases}$$

Figure 4:
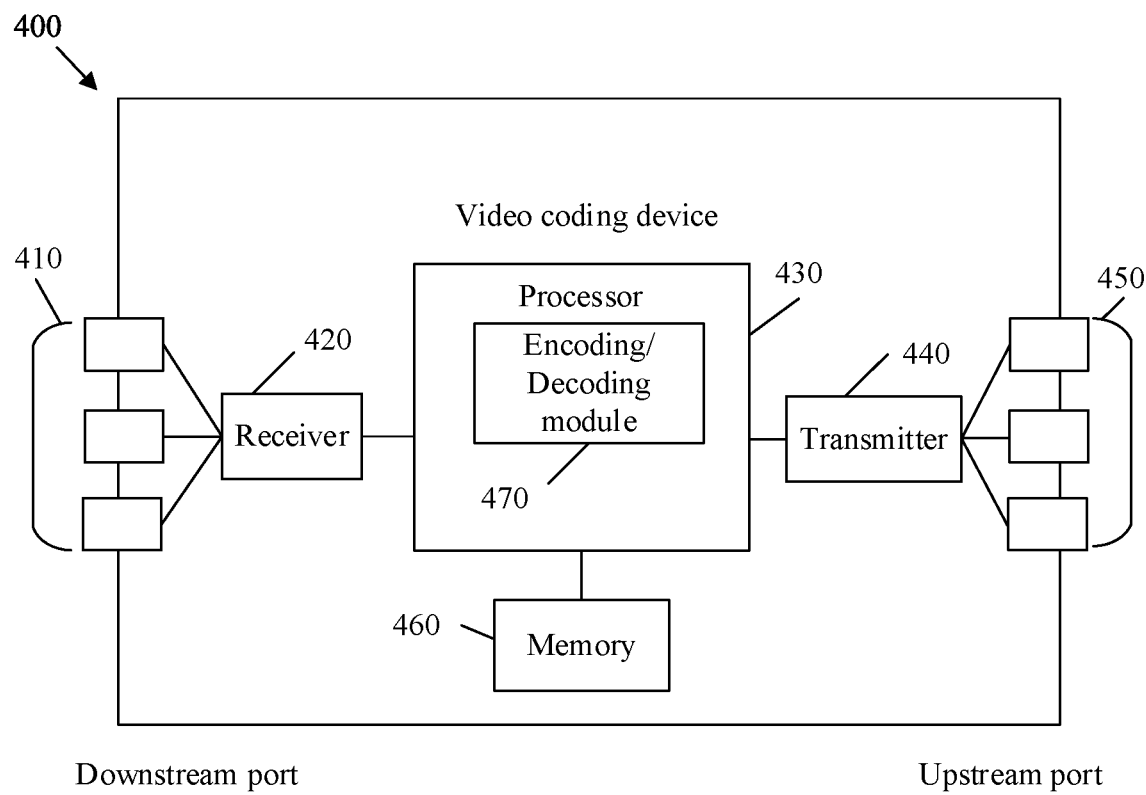
FIG. 4 is a block diagram of an example of a video coding device 400 according to an embodiment of the disclosure.

FIG. 4 is a schematic structural diagram of a video coding device 400 (for example, a video encoding device 400 or a video decoding device 400) according to an embodiment of the disclosure. The video coding device 400 is suitable for implementing an embodiment described in the specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process the data; a transmitter unit (Tx) 440 and egress ports 450 that are configured to transmit data; and a memory 460 configured to store the data. The video coding device 400 may further include optical-to-electrical components and electrical-to-optical (EO) components coupled to the ingress ports 410, the receiver unit 420, the transmitter unit 440, and the egress ports 450, for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in the specification, to implement the chrominance transform block prediction method provided in the embodiments of the disclosure. For example, the encoding/decoding module 470 implements, processes, or provides various coding operations. Therefore, inclusion of the encoding/decoding module 470 provides a substantial improvement to functions of the video coding device 400 and affects a transform of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or non-volatile, and may be a read-only memory (ROM), a random access memory (RAM), a ternary content-addressable memory (TCAM), and/or a static random access memory (SRAM).

Figure 5:
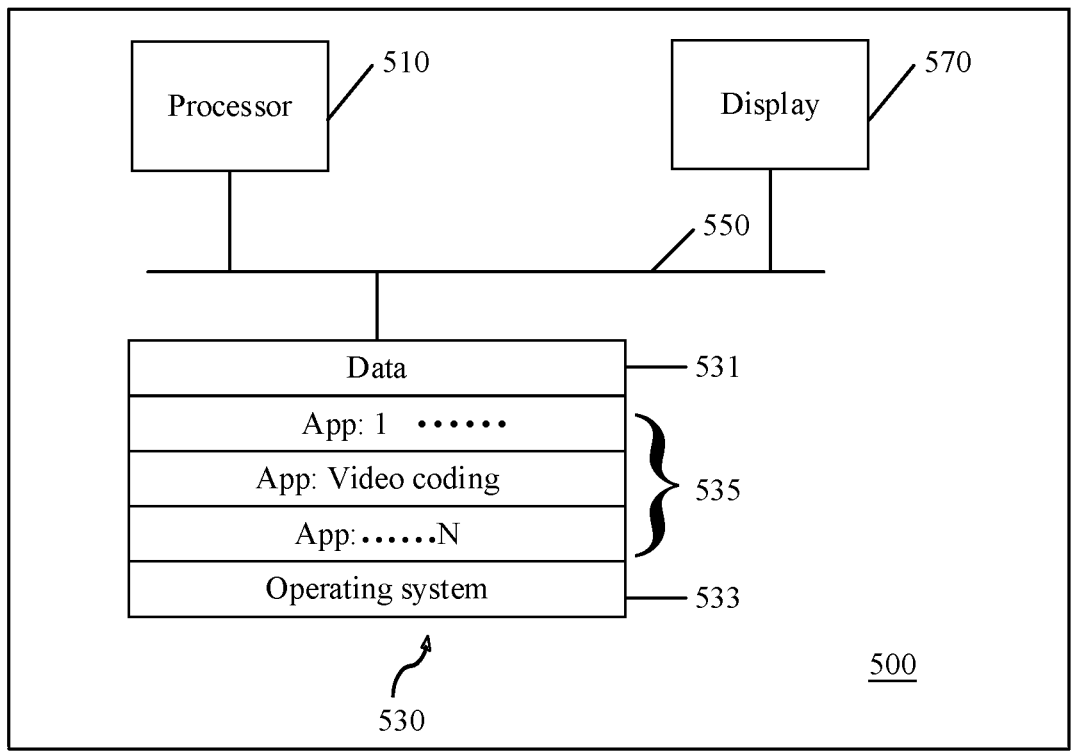
FIG. 5 is a block diagram of another example of an encoding apparatus or a decoding apparatus according to an embodiment of the disclosure.

FIG. 5 is simplified block diagram of an apparatus 500 that can be used as any one or two of the source device 12 and the destination device 14 in FIG. 1A according to an example embodiment. The apparatus 500 can implement the technologies of the disclosure. In other words, FIG. 5 is a schematic block diagram of an embodiment of an encoding device or a decoding device (coding device 500) according to an embodiment of the disclosure. The coding device 500 may include a processor 510, a memory 530, and a bus system 550. The processor and the memory are connected through the bus system. The memory is configured to store a set of instructions or program code. The processor is configured to execute the instructions or program code stored in the memory. The memory of the decoding device stores computer-readable program code. The processor can invoke the program code stored in the memory, to perform the video encoding or decoding method described in the disclosure. To avoid repetition, details are not described herein again.

In an embodiment, the processor 510 may be a central processing unit ("CPU"), or the processor 510 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

The memory 530 may include a read-only memory (ROM) device or a random access memory (RAM) device. Any other proper type of storage device may be alternatively used as the memory 530. The memory 530 may include code and data 531 accessed by the processor 510 by using the bus system 550. The memory 530 may further include an operating system 533 and an application program 535. The application program 535 includes at least one program that allows the processor 510 to perform the video encoding or decoding method described in the disclosure. For example, the application program 535 may include applications 1 to N, and further includes a video encoding or decoding application (video coding application) that performs the video encoding or decoding method described in the disclosure.

The bus system 550 may include a power bus, a control bus, a status signal bus, and the like, in addition to a data bus. However, for a clear description, various types of buses in the figure are denoted as the bus system 550.

In one embodiment, the coding device 500 may further include one or more output devices, for example, a display 570. In an example, the display 570 may be a touch display that combines a display and a touch unit that operably senses touch input. The display 570 may be connected to the processor 510 by using the bus system 550.

The following describes in detail the solutions in the embodiments of the disclosure.

In H.265, a quad-tree (QT)-based CTU split mode is used. A CTU is used as a root node (root) of a quad-tree, and the CTU is recursively split into several leaf nodes in the quad-tree split mode. One node corresponds to one image area. If a node is not split, the node is referred to as a leaf node, and an image area corresponding to the node becomes a CU. If a node is further split, an image area corresponding to the node is split into four areas of a same size (a length and a width of the four areas are respectively half a length and a width of the original area), and each area corresponds to one node. Whether these nodes are further split needs to be separately determined.

After determining, through parsing, that a node is a leaf node and the leaf node is a CU, coding information (including information such as a prediction mode and a transform coefficient of the CU, for example, a coding_unit ( ) syntax structure in H.265) corresponding to the CU is further parsed. Then, decoding processing such as prediction, dequantization, inverse transform, and loop filtering is performed on the CU based on the coding information, so as to generate a reconstructed image corresponding to the CU.

Dequantization is performed on a quantized transform coefficient of a luminance transform block of a CU to form a two-dimensional transform coefficient matrix A. Inverse transform is performed on the two-dimensional transform coefficient matrix A to generate a luminance transform block (luma transform block), where the luminance transform block includes reconstructed residual pixels of a luminance transform block. The luminance transform block is also a two-dimensional matrix. A reconstructed pixel of the luminance transform block is generated after the luminance transform block and a luminance prediction block are superimposed. To reduce complexity, two-dimensional separable transform (2D separable transform) is usually used in two-dimensional transform. The two-dimensional separable transform (for example, two-dimensional DCT-2) may be decomposed into vertical transform and horizontal transform. Examples of transform processing may include: performing column transform or vertical transform on a two-dimensional transform coefficient matrix A corresponding to the luminance transform block to generate a two-dimensional matrix B; and then performing row transform or horizontal transform on the two-dimensional matrix B to obtain a two-dimensional matrix C. The two-dimensional matrix C is the luminance transform block. A transform processing method for a chrominance transform block is the same as the transform processing method for the luminance transform block, and details are not described again for the sake of brevity. The row transform and column transform processing further includes clipping elements in a transformed matrix, to limit the elements to a range.

Processing of converting an original residual pixel into a transform coefficient through transform is referred to as a forward transform, and processing of converting a transform coefficient into a reconstructed residual pixel through transform is referred to as an inverse transform. Vertical transform in the forward transform and vertical transform in the inverse transform are in a forward-reverse transform relationship. For example, if the vertical transform in the forward transform is forward DCT-2, the vertical transform in the inverse transform is inverse DCT-2. Similarly, a horizontal transform in the forward transform and a horizontal transform in the inverse transform are in a forward-reverse transform relationship.

There is a "multiple transform selection" (MTS) tool in the second version of the H.266/VVC draft: One CU corresponds to one TU, a horizontal transform type and a vertical transform type of a luminance transform block of the TU are identified in a bitstream, and a horizontal transform type and a vertical transform type of a chrominance transform block of the TU are DCT-2. There are five combinations of a horizontal transform type and a vertical transform type that can be used by a luminance transform block, which are respectively DCT-2/DCT-2, DST-7/DST-7, DST-7/DCT-8, DCT-8/DST-7, and DCT-8/DCT-8. The combination Th/Tv indicates that a horizontal transform type is Th and a vertical transform type is Tv. For example, the combination DST-7/DCT-8 indicates that a horizontal transform type is DST-7 and a vertical transform type is DCT-8.

Figure 6:
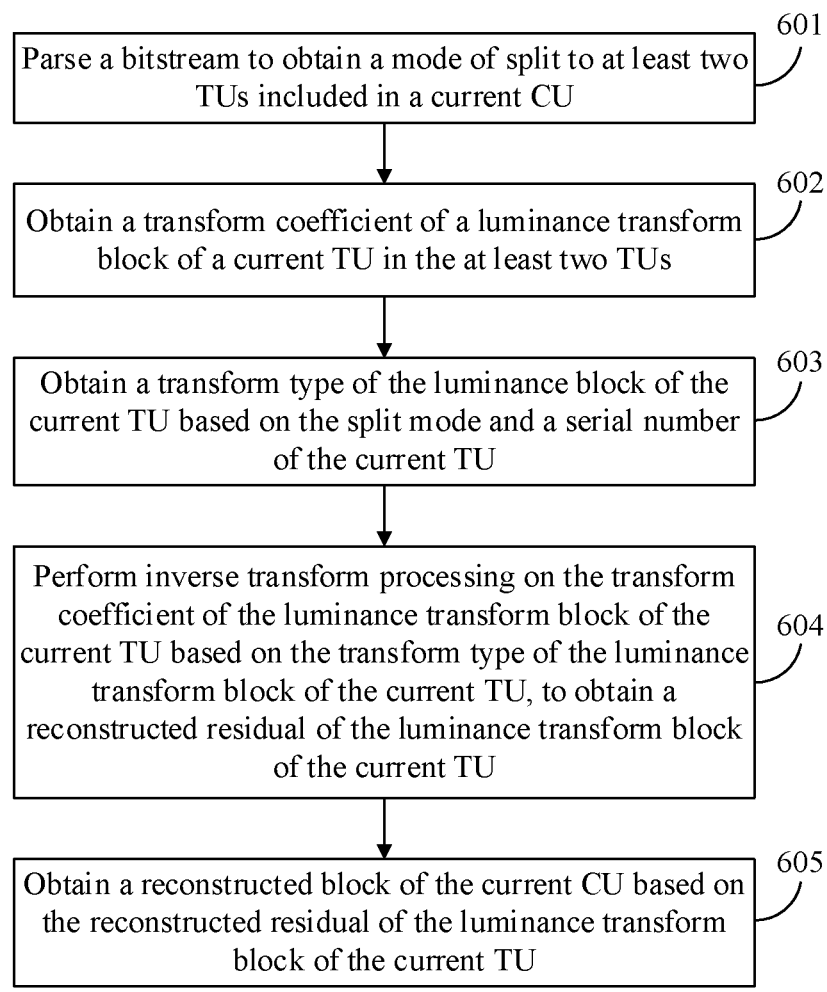
FIG. 6 is a simplified flowchart illustrating a video decoding method according to an embodiment of the disclosure.

FIG. 6 describes a simplified flowchart of a video decoding method according to an embodiment of the disclosure. The method includes the following operations:

601: Parse a bitstream to obtain a split mode to at least two TUs included in a current CU, where the split mode is configured to split a coverage area of the current CU into the at least two TUs, there is no overlapping area between the at least two TUs, the at least two TUs each have a serial number, and the serial numbers of the at least two TUs are in a one-to-one correspondence with positions of the at least two TUs in the current CU.

The split mode may be binary split, triple split, quaternary split, or the like.

Figure 7:
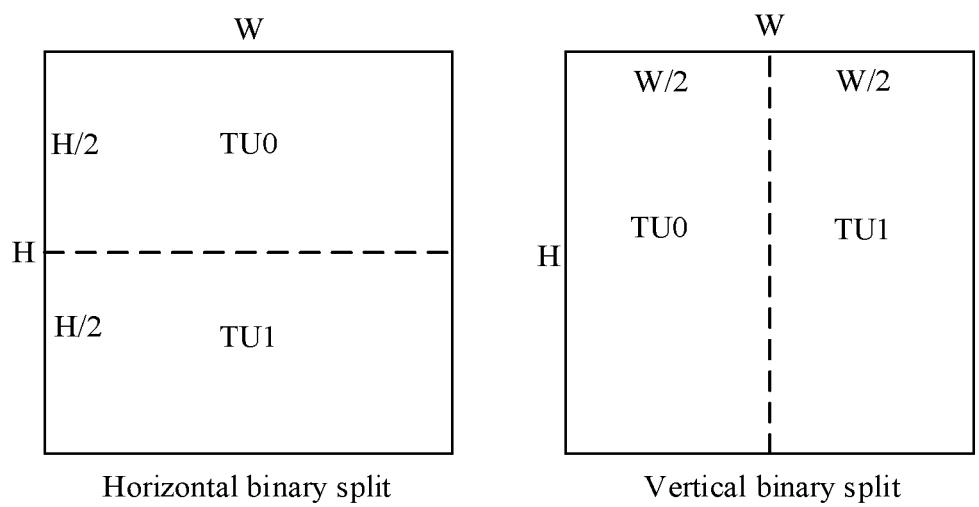
FIG. 7 is a graphical illustration of a split mode including a horizontal binary split and a vertical binary split according to an embodiment of the disclosure.

The binary split may be a horizontal binary split or a vertical binary split. FIG. 7 describes the horizontal binary split and the vertical binary split. As shown in FIG. 7, a size of the current CU is expressed as W×H (that is, there are W pixels in a horizontal direction, and H pixels in a vertical direction. This is also applicable to the following). In the binary split, the current CU is split into an upper TU and a lower TU. A serial number of the upper TU is TU0, and a serial number of the lower TU is TU1. A size of the upper TU is W×H/2, and a size of the lower TU is W×H/2. That is, the size of the upper TU is the same as the size of the lower TU. There is no overlapping area between the upper TU and the lower TU. In the vertical binary split, the current CU is split into a left TU and a right TU. A serial number of the left TU is TU0, and a serial number of the right TU is TU1. A size of the left TU is W/2×H, and a size of the right TU is W/2×H. That is, the size of the left TU is the same as the size of the right TU. There is no overlapping area between the left TU and the right TU.

Figure 8:
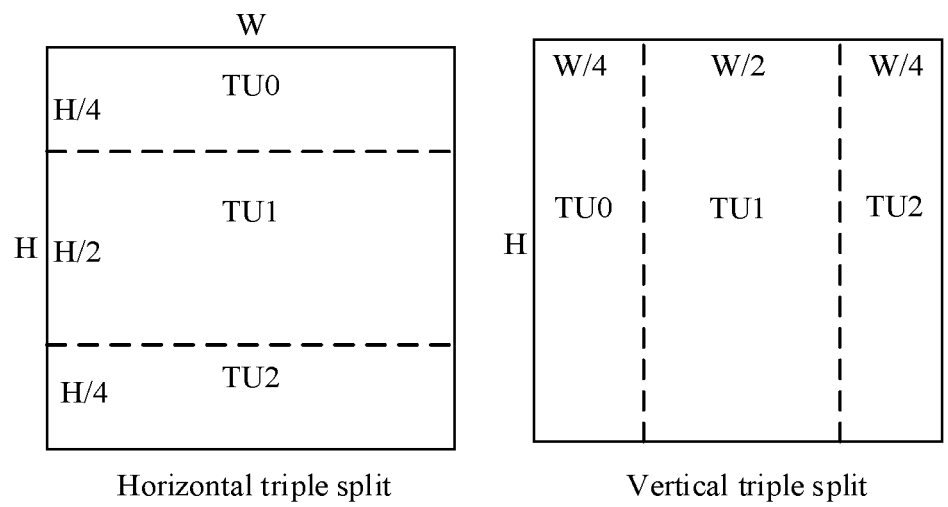
FIG. 8 is a graphical illustration of a split mode including a horizontal triple split and a vertical triple split according to an embodiment of the disclosure.

The triple split may be horizontal triple split. FIG. 8 describes the horizontal triple split and the vertical triple split. As shown in FIG. 8, a size of the current CU is represented as W×H. In the horizontal triple split, the current CU is split into an upper TU, a middle TU, and a lower TU, and there is no overlapping area between the upper TU, the middle TU, and the lower TU. A serial number of the upper TU is TU0, a serial number of the middle TU is TU1, and a serial number of the lower TU is TU2. A size of the upper TU is W×H/4, and a size of the lower TU is W×H/4. That is, the size of the upper TU is the same as the size of the lower TU. A size of the middle TU is W×H/2. It can be seen that the size of the middle TU is twice the size of the upper TU (the lower TU). In the vertical triple split, the current CU is split into a left TU, a middle TU, and a right TU, and there is no overlapping area between the left TU, the middle TU, and the right TU. A serial number of the left TU is TU0, a serial number of the middle TU is TU1, and a serial number of the right TU is TU2. A size of the left TU is W/4×H, and a size of the right TU is W/4×H. That is, the size of the left TU is the same as the size of the right TU. A size of the middle TU is W/2×H. It can be seen that the size of the middle TU is twice the size of the left TU (the right TU).

Figure 9:
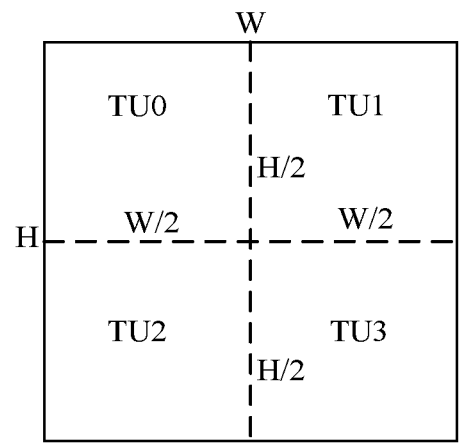
FIG. 9 is a graphical illustration of a split mode including a quaternary split according to an embodiment of the disclosure.

The quaternary split is shown in FIG. 9. As shown in FIG. 9, the quaternary split may be quad-tree split. That is, the current CU of a size W×H is split into four TUs of a same size. That is, a size of each TU is W/2×H/2. There is no overlapping area between the four TUs. A serial number of an upper left TU is denoted as TU0, a serial number of an upper right TU is denoted as TU1, a serial number of a lower left TU is denoted as TU2, and a serial number of a lower right TU is denoted as TU3.

602: Obtain a transform coefficient of a luminance transform block of a current TU in the at least two TUs.

A process of obtaining the transform coefficient may include: parsing out a related quantized coefficient from the bitstream, and performing an inverse quantization processing on the quantized coefficient to obtain a dequantized coefficient, that is, the transform coefficient. A specific process of obtaining a transform coefficient is not limited in an embodiment of the disclosure. Inverse quantization processing may also be referred to as dequantization processing. If a coded block flag (cbf) of the luminance transform block of the current TU is 0, it indicates that the transform coefficient of the luminance transform block of the current TU is 0. Correspondingly, a residual of the luminance transform block of the current TU is also 0. In this case, dequantization and inverse transform processing do not need to be performed on the luminance transform block of the current TU.

603: Obtain a transform type of the luminance transform block of the current TU based on the split mode and a serial number of the current TU, where the transform type includes a horizontal transform type and a vertical transform type.

The serial number of the current TU may be determined based on a preset TU processing order corresponding to the TU split mode. A TU with a smaller serial number is decoded first. It can be understood that, a case that only some TUs of the at least two TUs corresponding to the current CU may have a transform coefficient. In this case, inverse transform processing needs to be performed only on the some TUs having a transform coefficient. The inverse transform processing may also be referred to as detransform processing.

A split mode and a correspondence between a serial number of a TU and a corresponding transform type may be preset or predetermined. In this way, after the split mode and the serial number of the current TU are obtained, the transform type of the luminance transform block of the current TU may be obtained based on the correspondence. Certainly, a function may also be preset. The transform type of the luminance transform block of the current TU may be obtained by inputting the split mode and the serial number of the current TU.

It should be noted that in some embodiments, in an example split mode, a serial number of one TU corresponds to only one transform type. In this case, the transform type of the luminance transform block of the current TU may be directly determined based on the split mode and the serial number of the current TU. In some other embodiments, in an example split mode, a serial number of one TU may correspond to two or more transform types. In this case, after determining a certain transform type among the two or more transform types, an encoder may write indication information of the determined transform type into the bitstream, so that a decoder may further determine the transform type of the luminance transform block of the current TU based on the indication information. That is, the transform type of the luminance transform block of the current TU may be determined based on the split mode, the serial number of the current TU, and the indication information of the transform type.

It can be understood that, the foregoing embodiment describes determining of the transform type of the luminance transform block of the current TU. In an actual application, a transform type of a chrominance transform block of the current TU may also be determined in a same manner; or a chrominance transform block of the current TU may directly use the transform type of the luminance transform block of the current TU; or a transform type of a chrominance transform block of the current TU may be a preset default transform type; or a transform type of a chrominance transform block of the current TU may be determined in another manner. An embodiment of the disclosure does not limit a manner of determining the transform type of the chrominance transform block of the current TU. In an embodiment, a default horizontal transform type and a default vertical transform type of a chrominance transform block of each TU may both be the DCT-2 type.

604: Perform an inverse transform processing on the transform coefficient of the luminance transform block of the current TU based on the transform type of the luminance transform block of the current TU to obtain a reconstructed residual of the luminance transform block of the current TU, where the reconstructed residual may be the foregoing reconstructed residual block 313.

For an inverse transform processing process, refer to the foregoing description. An embodiment of the disclosure does not limit the specific inverse transform process.

605: Obtain a reconstructed block of the current CU based on the reconstructed residual of the luminance transform block of the current TU.

For a reconstruction process, refer to the foregoing description. An embodiment of the disclosure does not limit a specific process of obtaining the reconstructed block. A common processing manner is adding the reconstructed residual of the luminance transform block and a prediction pixel corresponding to the luminance transform block, to obtain a reconstructed pixel. The reconstructed block is also referred to as a rebuilt block.

By using the solution provided in the disclosure, different transform types may be set for TUs at different positions, so that the transform types are more suitable for transform processing/inverse transform processing at different positions, thereby improving encoding/decoding efficiency and encoding/decoding quality. Further, when only some of the TUs included in the current CU include a residual, transform processing/inverse transform processing may be directly performed by using a transform type corresponding to the TU including the residual, so as to improve coding efficiency/decoding efficiency of the TU having the residual.

The following describes some transform types corresponding to TUs with different serial numbers in different split modes in an embodiment of the disclosure.

A: horizontal binary split

For example, when the split mode is the horizontal binary split, the horizontal binary split is used to horizontally split the coverage area of the current CU into an upper TU and a lower TU, where the upper TU and the lower TU have a same size; a transform type corresponding to a luminance transform block of the upper TU and a transform type corresponding to a luminance transform block of the lower TU have a same horizontal transform type; and a serial number of the upper TU is denoted as TU0, and a serial number of the lower TU is denoted as TU1.

A1: Obtaining the transform type of the luminance transform block of the current TU based on the split mode and the serial number of the current TU may include: applying or selecting a DCT-8 type as a vertical transform type in the transform type of the luminance transform block of the current TU when the serial number of the current TU is TU0; and/or applying or selecting a DST-7 type as the vertical transform type in the transform type of the luminance transform block of the current TU when the serial number of the current TU is TU1. An embodiment of the disclosure does not limit the horizontal transform type corresponding to TU0 and TU1 in this scenario. For example, the horizontal transform type may be the DST-7 type, the DCT-2 type, or the DCT-8 type.

A2: Obtaining the transform type of the luminance transform block of the current TU based on the split mode and the serial number of the current TU may include: applying or selecting a DST-7 type as a vertical transform type in the transform type of the luminance transform block of the current TU when the serial number of the current TU is TU0; and/or applying or selecting a DCT-8 type as the vertical transform type in the transform type of the luminance transform block of the current TU when the serial number of the current TU is TU1. An embodiment of the disclosure does not limit the horizontal transform type corresponding to TU0 and TU1 in this scenario. For example, the horizontal transform type may be the DST-7 type, the DCT-2 type, or the DCT-8 type.

Examples (A1 and A2) of two different transform types in the horizontal binary split have been described above, and either of the two different transform types may be used as a default transform type. In this case, the encoder does not need to write transform type indication information into the bitstream. The foregoing two different transform types may both alternatively be used as candidate transform types. In this case, when the encoder determines one of the two different transform types as the transform type of the luminance transform block of the current TU in an RDO manner, to enable the decoder to directly determine the transform type that needs to be used to perform inverse transform processing, the encoder may write indication information of the determined transform type into the bitstream, so that the decoder may determine, based on the indication information, the transform type to be used to perform inverse transform processing on the transform coefficient of the luminance transform block of the current TU. The indication information may be a one-bit flag. It should be noted that, in order to further improve inverse transform efficiency and effect, when both A1 and A2 are used as candidate transform types, different transform types may be selected as the horizontal transform types in the A1 and A2 scenarios. For example, the horizontal transform type in the A1 scenario may be the DST-7 type or the DCT-2 type, and the horizontal transform type in the A2 scenario may be the DCT-8 type.

B: Vertical Binary Split

The vertical binary split is used to horizontally split the coverage area of the current CU into a left TU and a right TU, where the left TU and the right TU have a same size; a transform type corresponding to a luminance transform block of the left TU and a transform type corresponding to a luminance transform block of the right TU have a same vertical transform type; and a serial number of the left TU is denoted as TU0, and a serial number of the right TU is denoted as TU1.

B1: Obtaining the transform type of the luminance transform block of the current TU based on the split mode and the serial number of the current TU may include: applying or selecting a DCT-8 type as a horizontal transform type in the transform type of the luminance transform block of the current TU when the serial number of the current TU is TU0; and/or applying or selecting a DST-7 type as the horizontal transform type in the transform type of the luminance transform block of the current TU when the serial number of the current TU is TU1. An embodiment of the disclosure does not limit the vertical transform type corresponding to TU0 and TU1 in this scenario. For example, the vertical transform type may be the DST-7 type, the DCT-2 type, or the DCT-8 type.

B2: Obtaining the transform type of the luminance transform block of the current TU based on the split mode and the serial number of the current TU may include: applying or selecting a DST-7 type as a horizontal transform type in the transform type of the luminance transform block of the current TU when the serial number of the current TU is TU0; and/or applying or selecting a DCT-8 type as the horizontal transform type in the transform type of the luminance transform block of the current TU when the serial number of the current TU is TU1. An embodiment of the disclosure does not limit the vertical transform type corresponding to TU0 and TU1 in this scenario. For example, the vertical transform type may be the DST-7 type, the DCT-2 type, or the DCT-8 type.

Examples (B1 and B2) of two different transform types in the vertical binary split are described above, and either of the two different transform types may be used as a default transform type. In this case, the encoder does not need to write transform type indication information into the bitstream. The foregoing two different transform types may both alternatively be used as candidate transform types. In this case, when the encoder determines one of the two different transform types as the transform type of the luminance transform block of the current TU in an RDO manner, to enable the decoder to directly determine the transform type that needs to be used to perform inverse transform processing, the encoder may write indication information of the determined transform type into the bitstream, so that the decoder may determine, based on the indication information, the transform type to be used to perform inverse transform processing on the transform coefficient of the luminance transform block of the current TU. The indication information may be a one-bit flag. It should be noted that, in order to further improve inverse transform efficiency and effect, when both B1 and B2 are used as candidate transform types, different transform types may be selected as the horizontal transform types in the B1 and B2 scenarios. For example, the horizontal transform type in the B1 scenario may be the DST-7 type or the DCT-2 type, and the horizontal transform type in the B2 scenario may be the DCT-8 type.

C: Horizontal Triple Split

The horizontal triple split is used to horizontally split the coverage area of the current CU into an upper TU, a middle TU, and a lower TU, and the upper TU and the lower TU have a same size; a size of the middle TU is twice the size of the upper TU. A transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type. And a serial number of the upper TU is TU0, a serial number of the middle TU is TU1, and a serial number of the lower TU is TU2.

C1: Obtaining the transform type of the luminance transform block of the current TU based on the split mode and the serial number of the current TU may include: applying or selecting a DCT-8 type as a vertical transform type in the transform type of the luminance transform block of the current TU when the serial number of the current TU is TU0; and/or applying or selecting a DCT-2 type as the vertical transform type in the transform type of the luminance transform block of the current TU when the serial number of the current TU is TU1; and/or applying or selecting a DST-7 type as the vertical transform type in the transform type of the luminance transform block of the current TU when the serial number of the current TU is TU2. An embodiment of the disclosure does not limit the horizontal transform type corresponding to TU0, TU1, and TU2 in this scenario. For example, the horizontal transform type may be the DST-7 type, the DCT-2 type, or the DCT-8 type.

C2: Obtaining the transform type of the luminance transform block of the current TU based on the split mode and the serial number of the current TU may include: applying or selecting a DCT-8 type as a vertical transform type in the transform type of the luminance transform block of the current TU when the serial number of the current TU is TU0; and/or applying or selecting a DST-7 type as a vertical transform type in the transform type of the luminance transform block of the current TU when the serial number of the current TU is TU1; and/or applying or selecting a DST-7 type as a vertical transform type in the transform type of the luminance transform block of the current TU when the serial number of the current TU is TU2. An embodiment of the disclosure does not limit the horizontal transform type corresponding to TU0, TU1, and TU2 in this scenario. For example, the horizontal transform type may be the DST-7 type, the DCT-2 type, or the DCT-8 type.

C3: Obtaining the transform type of the luminance transform block of the current TU based on the split mode and the serial number of the current TU may include: applying or selecting a DST-7 type as a vertical transform type in the transform type of the luminance transform block of the current TU when the serial number of the current TU is TU0; and/or applying or selecting a DCT-8 type as a vertical transform type in the transform type of the luminance transform block of the current TU when the serial number of the current TU is TU1; and/or applying or selecting a DCT-8 type as a vertical transform type in the transform type of the luminance transform block of the current TU when the serial number of the current TU is TU2. An embodiment of the disclosure does not limit the horizontal transform type corresponding to TU0, TU1, and TU2 in this scenario. For example, the horizontal transform type may be the DST-7 type, the DCT-2 type, or the DCT-8 type.

Examples (C1, C2, and C3) of three different transform types in the horizontal triple split are described above, and any of the three different transform types may be used as a default transform type. In this case, the encoder does not need to write transform type indication information into the bitstream. The foregoing three different transform types may all be used as candidate transform types, or any two of the three different transform types may be used as candidate transform types. In this case, when the encoder determines one of the three or two different transform types as the transform type of the luminance transform block of the current TU in an RDO manner, to enable the decoder to directly determine the transform type that needs to be used to perform inverse transform processing, the encoder may write indication information of the determined transform type into the bitstream, so that the decoder may determine, based on the indication information, the transform type to be used to perform inverse transform processing on the transform coefficient of the luminance transform block of the current TU. When there are three candidate transform types, the indication information may be transmitted by using two bits, for example, may be a two-bit index. When there are two candidate transform types, the indication information may be a one-bit flag. For example, when the candidate transform types are C1 and C2, the horizontal transform type corresponding to TU0, TU1, and TU2 in the C1 scenario may be the DST-7 type or the DCT-2 type, and the horizontal transform type corresponding to TU0, TU1, and TU2 in the C2 scenario may be DCT-8. For example, when the candidate transform types are C1 and C3, the horizontal transform type corresponding to TU0, TU1, and TU2 in the C1 scenario may be the DST-7 type or the DCT-2 type, and the horizontal transform type corresponding to TU0, TU1, and TU2 in the C3 scenario may be DCT-8.

D: Vertical Triple Split

The vertical triple split is used to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is denoted as TU1, and a serial number of the right TU is denoted as TU2.

D1: Obtaining the transform type of the luminance transform block of the current TU based on the split mode and the serial number of the current TU may include: applying or selecting a DCT-8 type as a horizontal transform type in the transform type of the luminance transform block of the current TU when the serial number of the current TU is TU0; and/or applying or selecting a DCT-2 type as the horizontal transform type in the transform type of the luminance transform block of the current TU when the serial number of the current TU is TU1; and/or applying or selecting a DST-7 type as the horizontal transform type in the transform type of the luminance transform block of the current TU when the serial number of the current TU is TU2. An embodiment of the disclosure does not limit the vertical transform type corresponding to TU0, TU1, and TU2 in this scenario. For example, the vertical transform type may be the DST-7 type, the DCT-2 type, or the DCT-8 type.

D2: Obtaining the transform type of the luminance transform block of the current TU based on the split mode and the serial number of the current TU may include: applying or selecting a DCT-8 type as a horizontal transform type in the transform type of the luminance transform block of the current TU when the serial number of the current TU is TU0; and/or applying or selecting a DST-7 type as the horizontal transform type in the transform type of the luminance transform block of the current TU when the serial number of the current TU is TU1; and/or applying or selecting a DST-7 type as the horizontal transform type in the transform type of the luminance transform block of the current TU when the serial number of the current TU is TU2. An embodiment of the disclosure does not limit the vertical transform type corresponding to TU0, TU1, and TU2 in this scenario. For example, the vertical transform type may be the DST-7 type, the DCT-2 type, or the DCT-8 type.

D3: Obtaining the transform type of the luminance transform block of the current TU based on the split mode and the serial number of the current TU may include: applying or selecting a DST-7 type as a horizontal transform type in the transform type of the luminance transform block of the current TU when the serial number of the current TU is TU0; and/or applying or selecting a DCT-8 type as the horizontal transform type in the transform type of the luminance transform block of the current TU when the serial number of the current TU is TU1; and/or applying or selecting a DCT-8 type as the horizontal transform type in the transform type of the luminance transform block of the current TU when the serial number of the current TU is TU2. An embodiment of the disclosure does not limit the vertical transform type corresponding to TU0, TU1, and TU2 in this scenario. For example, the vertical transform type may be the DST-7 type, the DCT-2 type, or the DCT-8 type.

Examples (D1, D2, and D3) of three different transform types in the vertical triple split are described above, and any of the three different transform types may be used as a default transform type. In this case, the encoder does not need to write transform type indication information into the bitstream. The foregoing three different transform types may all be used as candidate transform types, or any two of the three different transform types may be used as candidate transform types. In this case, when the encoder determines one of the three or two different transform types as the transform type of the luminance transform block of the current TU in an RDO manner, to enable the decoder to directly determine the transform type that needs to be used to perform inverse transform processing, the encoder may write indication information of the determined transform type into the bitstream, so that the decoder may determine, based on the indication information, the transform type to be used to perform inverse transform processing on the transform coefficient of the luminance transform block of the current TU. When there are three candidate transform types, the indication information may be transmitted by using two bits, for example, may be a two-bit index. When there are two candidate transform types, the indication information may be a one-bit flag. For example, when the candidate transform types are C1 and C2, the vertical transform type corresponding to TU0, TU1, and TU2 in the C1 scenario may be the DST-7 type or the DCT-2 type, and the vertical transform type corresponding to TU0, TU1, and TU2 in the C2 scenario may be DCT-8. For example, when the candidate transform types are C1 and C3, the vertical transform type corresponding to TU0, TU1, and TU2 in the C1 scenario may be the DST-7 type or the DCT-2 type, and the vertical transform type corresponding to TU0, TU1, and TU2 in the C3 scenario may be DCT-8.

E: Quad-Tree Split

The quad-tree split is used to evenly split the coverage area of the current CU into four TUs: an upper left TU, an upper right TU, a lower left TU, and a lower right TU. The four TUs have a same size; and a serial number of the upper left TU is denoted as TU0, a serial number of the upper right TU is denoted as TU1, a serial number of the lower left TU is denoted as TU2, and a serial number of the lower right TU is denoted as TU3.

E1: Obtaining the transform type of the luminance transform block of the current TU based on the split mode and the serial number of the current TU may include: applying or selecting a DCT-8 type as a horizontal transform type in the transform type of the luminance transform block of the current TU, and the DCT-8 type as a vertical transform type when the serial number of the current TU is TU0; and/or applying or selecting a DST-7 type as the horizontal transform type in the transform type of the luminance transform block of the current TU, and the DCT-8 type as the vertical transform type when the serial number of the current TU is TU1; and/or applying or selecting the DCT-8 type as the horizontal transform type in the transform type of the luminance transform block of the current TU, and the DST-7 type as the vertical transform type when the serial number of the current TU is TU2; and/or applying or selecting the DST-7 type as the horizontal transform type in the transform type of the luminance transform block of the current TU, and the DST-7 type as the vertical transform type when the serial number of the current TU is TU3.

E2: Obtaining the transform type of the luminance transform block of the current TU based on the split mode and the serial number of the current TU may include: applying or selecting a DST-7 type as a horizontal transform type in the transform type of the luminance transform block of the current TU, and the DST-7 type as a vertical transform type when the serial number of the current TU is TU0; and/or applying or selecting a DCT-8 type as the horizontal transform type in the transform type of the luminance transform block of the current TU, and the DST-7 type as the vertical transform type when the serial number of the current TU is TU1; and/or applying or selecting the DST-7 type as the horizontal transform type in the transform type of the luminance transform block of the current TU, and the DCT-8 type as the vertical transform type when the serial number of the current TU is TU2; and/or applying or selecting the DCT-8 type as the horizontal transform type in the transform type of the luminance transform block of the current TU, and the DCT-8 type as the vertical transform type when the serial number of the current TU is TU3.

Examples (E1 and E2) of two different transform types in the quad-tree split are described above, and either of the two different transform types may be used as a default transform type. In this case, the encoder does not need to write transform type indication information into the bitstream. The foregoing two different transform types may both alternatively be used as candidate transform types. In this case, when the encoder determines one of the two different transform types as the transform type of the luminance transform block of the current TU in an RDO manner, to enable the decoder to directly determine the transform type that needs to be used to perform inverse transform processing, the encoder may write indication information of the determined transform type into the bitstream, so that the decoder may determine, based on the indication information, the transform type to be used to perform inverse transform processing on the transform coefficient of the luminance transform block of the current TU. The indication information may be a one-bit flag.

It should be noted that the specific horizontal transform types and/or vertical transform types described above are only examples, and other transform types may also be used in actual application. In some embodiments, the DCT-8 type may be replaced with a DCT-4 type; and/or the DST-7 type may be replaced with a DST-4 type.

A video decoding apparatus provided by another embodiment of the disclosure includes an entropy decoding unit 304, an inverse quantization unit 310, an inverse transform processing unit 312, and a reconstruction unit 314.

The entropy decoding unit 304 is configured to parse a bitstream to obtain a split mode to at least two TUs included in a current CU. The split mode is used to split a coverage area of the current CU into the at least two TUs, there is no overlapping area between the at least two TUs, the at least two TUs each have a serial number, and the serial numbers of the at least two TUs are in a one-to-one correspondence with positions of the at least two TUs in the current CU.

For some embodiments, refer to the description of the foregoing operation 601, and details are not described herein again.

The inverse quantization unit 310 is configured to obtain a transform coefficient of a luminance transform block of a current TU in the at least two TUs.

For some embodiments, refer to the description of the foregoing operation 602, and details are not described herein again.

The inverse transform processing unit 312 is configured to obtain a transform type of the luminance transform block of the current TU based on the split mode and a serial number of the current TU, where the transform type includes a horizontal transform type and a vertical transform type; and perform inverse transform processing on the transform coefficient of the luminance transform block of the current TU based on the transform type of the luminance transform block of the current TU, to obtain a reconstructed residual of the luminance transform block of the current TU.

For some embodiments, refer to the description of the foregoing operations 603 and 604, and details are not described herein again.

The reconstruction unit 314 is configured to obtain a reconstructed block of the current CU based on the reconstructed residual of the luminance transform block of the current TU.

For some embodiments, refer to the description of the foregoing operation 605, and details are not described herein again.

For some embodiments of the apparatus embodiment, refer to detailed descriptions of the foregoing method embodiment. For brevity of the specification, details are not described herein again.

Figure 10:
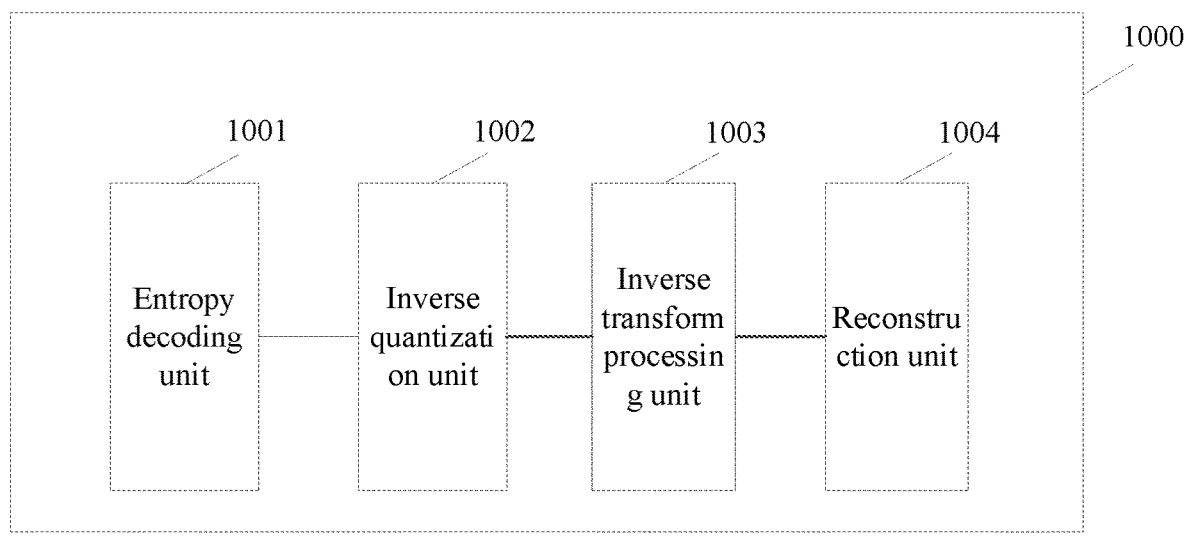
FIG. 10 is a structural block diagram of a video decoding device according to an embodiment of the disclosure.

FIG. 10 is a structural block diagram of a video decoding device or apparatus 1000 according to an embodiment of the disclosure. The video decoding device or apparatus 1000 may include an entropy decoding unit 1001 configured to parse a bitstream to obtain a split mode to at least two transform units (TUs) included in a current coding unit (CU). The split mode is configured to split a coverage area of the current CU into the at least two transform units. There is no overlapping area between the at least two transform units. Each of the at least two transform units has a serial number, and the serial numbers of the at least two transform units are in a one-to-one correspondence with positions of the at least two transform units in the current CU.

The video decoding apparatus 1000 also includes an inverse quantization unit 1002 configured to obtain a transform coefficient of a luminance transform block of a current TU in the at least two transform units.

The video decoding apparatus 1000 also includes an inverse transform processing unit 1003 configured to obtain a transform type of the luminance transform block of the current TU based on the split mode and a serial number of the current TU. The transform type includes a horizontal transform type and a vertical transform type. The inverse transform processing unit 1003 is configured to perform an inverse transform processing on the transform coefficient of the luminance transform block of the current TU based on the transform type of the luminance transform block of the current TU to obtain a reconstructed residual of the luminance transform block of the current TU. The video decoding apparatus 1000 also includes a reconstruction unit 1004 configured to obtain a reconstructed block of the current CU based on the reconstructed residual of the luminance transform block of the current TU.

In one embodiment, the split mode is a horizontal binary split configured to horizontally split the coverage area of the current CU into an upper TU and a lower TU. The upper TU and the lower TU have a same size. A transform type corresponding to a luminance transform block of the upper TU and a transform type corresponding to a luminance transform block of the lower TU have a same horizontal transform type; and a serial number of the upper TU is TU0, and a serial number of the lower TU is TU1. To obtain the transform type of the luminance transform block of the current TU, the inverse transform processing unit is configure to apply a DCT-8 type as a vertical transform type in the transform type of the luminance transform block of the current TU when the serial number of the current TU is TU0; and/or apply a DST-7 type as the vertical transform type in the transform type of the luminance transform block of the current TU when the serial number of the current TU is TU1.

In one embodiment, the split mode is a horizontal binary split configured to horizontally split the coverage area of the current CU into an upper TU and a lower TU. The upper TU and the lower TU have a same size. A transform type corresponding to a luminance transform block of the upper TU and a transform type corresponding to a luminance transform block of the lower TU have a same horizontal transform type; and a serial number of the upper TU is TU0, and a serial number of the lower TU is TU1. To obtain the transform type of the luminance transform block of the current TU, the inverse transform processing unit is configure to apply a DST-7 type as a vertical transform type in the transform type of the luminance transform block of the current TU when the serial number of the current TU is TU0; and/or apply a DCT-8 type as the vertical transform type in the transform type of the luminance transform block of the current TU when the serial number of the current TU is TU1.

In one embodiment, the split mode is a vertical binary split, configured to horizontally split the coverage area of the current CU into a left TU and a right TU, and the left TU and the right TU have a same size. A transform type corresponding to a luminance transform block of the left TU and a transform type corresponding to a luminance transform block of the right TU have a same vertical transform type; and a serial number of the left TU is TU0, and a serial number of the right TU is TU 1. To obtain the transform type of the luminance transform block of the current TU, the inverse transform processing unit is configure to apply a DCT-8 type as a horizontal transform type in the transform type of the luminance transform block of the current TU when the serial number of the current TU is TU0; and/or apply a DST-7 type as the horizontal transform type in the transform type of the luminance transform block of the current TU when the serial number of the current TU is TU1.

In one embodiment, the split mode is a vertical binary split configured to horizontally split the coverage area of the current CU into a left TU and a right TU, and the left TU and the right TU have a same size. A transform type corresponding to a luminance transform block of the left TU and a transform type corresponding to a luminance transform block of the right TU have a same vertical transform type; and a serial number of the left TU is TU0, and a serial number of the right TU is TU 1. To obtain the transform type of the luminance transform block of the current TU, the inverse transform processing unit is configure to apply a DST-7 type as a horizontal transform type in the transform type of the luminance transform block of the current TU when the serial number of the current TU is TU0; and/or apply a DCT-8 type as the horizontal transform type in the transform type of the luminance transform block of the current TU when the serial number of the current TU is TU1.

In one embodiment, the split mode is a horizontal triple split configured to horizontally split the coverage area of the current CU into an upper TU, a middle TU, and a lower TU. The upper TU and the lower TU have a same size; a size of the middle TU is twice the size of the upper TU. A transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2. To obtain the transform type of the luminance transform block of the current TU, the inverse transform processing unit is configure to apply a DCT-8 type as a vertical transform type in the transform type of the luminance transform block of the current TU when the serial number of the current TU is TU0; and/or apply a DCT-2 type as the vertical transform type in the transform type of the luminance transform block of the current TU when the serial number of the current TU is TU1; and/or apply a DST-7 type as the vertical transform type in the transform type of the luminance transform block of the current TU when the serial number of the current TU is TU2.

In one embodiment, the split mode is a horizontal triple split configured to horizontally split the coverage area of the current CU into an upper TU, a middle TU, and a lower TU, and the upper TU and the lower TU have a same size; a size of the middle TU is twice the size of the upper TU. A transform type corresponding to a luminance transform block of the upper TU and a transform type corresponding to a luminance transform block of the lower TU have a same horizontal transform type. A transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2. To obtain the transform type of the luminance transform block of the current TU, the inverse transform processing unit is configure to apply a DCT-8 type as a vertical transform type in the transform type of the luminance transform block of the current TU when the serial number of the current TU is TU0; and/or apply a DST-7 type as the vertical transform type in the transform type of the luminance transform block of the current TU when the serial number of the current TU is TU1; and/or apply the DST-7 type as the vertical transform type in the transform type of the luminance transform block of the current TU when the serial number of the current TU is TU2.

In one embodiment, the split mode is a horizontal triple split configured to horizontally split the coverage area of the current CU into an upper TU, a middle TU, and a lower TU, and the upper TU and the lower TU have a same size; a size of the middle TU is twice the size of the upper TU. A transform type corresponding to a luminance transform block of the upper TU and a transform type corresponding to a luminance transform block of the lower TU have a same horizontal transform type, and a transform type corresponding to a luminance transform block of the middle TU and the transform type corresponding to the luminance transform block of the lower TU have a same horizontal transform type; and a serial number of the upper TU is TU0, a serial number of the middle TU is TU1, and a serial number of the lower TU is TU2. To obtain the transform type of the luminance transform block of the current TU, the inverse transform processing unit is configure to apply a DST-7 type as a vertical transform type in the transform type of the luminance transform block of the current TU when the serial number of the current TU is TU0; and/or apply a DCT-8 type to the vertical transform type in the transform type of the luminance transform block of the current TU when the serial number of the current TU is TU1; and/or apply the DCT-8 type as the vertical transform type in the transform type of the luminance transform block of the current TU when the serial number of the current TU is TU2.

In one embodiment, the split mode is a vertical triple split configured to horizontally split the coverage area of the current CU into a left TU, a middle TU, and a right TU, and the left TU and the right TU have a same size; a size of the middle TU is twice the size of the left TU. A transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2. To obtain the transform type of the luminance transform block of the current TU, the inverse transform processing unit is configure to apply a DCT-8 type as a horizontal transform type in the transform type of the luminance transform block of the current TU when the serial number of the current TU is TU0; and/or apply a DCT-2 type as the horizontal transform type in the transform type of the luminance transform block of the current TU when the serial number of the current TU is TU1; and/or apply a DST-7 type as the horizontal transform type in the transform type of the luminance transform block of the current TU when the serial number of the current TU is TU2.

In one embodiment, the split mode is a vertical triple split configured to horizontally split the coverage area of the current CU into a left TU, a middle TU, and a right TU, and the left TU and the right TU have a same size; a size of the middle TU is twice the size of the left TU. A transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2. To obtain the transform type of the luminance transform block of the current TU, the inverse transform processing unit is configure to apply a DCT-8 type as a horizontal transform type in the transform type of the luminance transform block of the current TU when the serial number of the current TU is TU0; and/or apply a DST-7 type as a horizontal transform type in the transform type of the luminance transform block of the current TU when the serial number of the current TU is TU1; and/or apply the DST-7 type as a horizontal transform type in the transform type of the luminance transform block of the current TU when the serial number of the current TU is TU2.

In one embodiment, the split mode is a vertical triple split configured to horizontally split the coverage area of the current CU into a left TU, a middle TU, and a right TU, and the left TU and the right TU have a same size; a size of the middle TU is twice the size of the left TU. A transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2. To obtain the transform type of the luminance transform block of the current TU, the inverse transform processing unit is configure to apply a DST-7 type as a horizontal transform type in the transform type of the luminance transform block of the current TU when the serial number of the current TU is TU0; and/or apply a DCT-8 type as the horizontal transform type in the transform type of the luminance transform block of the current TU when the serial number of the current TU is TU1; and/or apply the DCT-8 type as a horizontal transform type in the transform type of the luminance transform block of the current TU when the serial number of the current TU is TU2.

In one embodiment, the apparatus 1000 may further be configured to parse the bitstream to obtain indication information of the transform type of the luminance transform block of the current TU. The inverse transform processing unit is configured to obtain the transform type of the luminance transform block of the current TU based on the split mode and the indication information.

In one embodiment, the DCT-8 type can be replaced with a DCT-4 type. In one embodiment, the DST-7 type can be replaced with a DST-4 type.

A person skilled in the art will understand that the functions described with reference to various illustrative logical blocks, modules, and algorithm operations disclosed and described in the specification can be implemented by hardware, software, firmware, or any combination thereof. If implemented by software, the functions described with reference to the various illustrative logical blocks, modules, and operations may be stored in or transmitted over a computer-readable medium as one or more instructions or program code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, a communications protocol). In this manner, the computer-readable medium may correspond to: (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the techniques described in the disclosure. A computer program product may include the computer-readable medium.

By way of example and not by way of limitation, such computer-readable storage media may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, server, or another remote source through a coaxial cable, an optical fiber, a twisted pair, a digital subscriber line (DSL), or wireless technologies such as infrared, radio, and microwave, the coaxial cable, optical fiber, twisted pair, DSL, or wireless technologies such as infrared, radio, and microwave are included in a definition of medium. However, it should be understood that the computer-readable storage medium and the data storage medium do not include connections, carriers, signals, or other transitory media, but actually means non-transitory tangible storage media. Disks and discs used in the specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included within the scope of the computer-readable medium.

An instruction may be executed by one or more processors such as one or more digital signal processors (DSP), general purpose microprocessors, application-specific integrated circuits (ASIC), field-programmable gate arrays (FPGA), or other equivalent integrated or discrete logic circuits. Therefore, the term "processor" used in the specification may refer to any of the foregoing structures or any other structure suitable for implementing the techniques described in the specification. In addition, in some aspects, the functions described with reference to the various illustrative logical blocks, modules, and operations described in the specification may be provided within special-purpose hardware and/or software modules configured for encoding and decoding, or may be incorporated into a combined codec. In addition, the techniques may be fully implemented in one or more circuits or logic elements.

The techniques of the disclosure may be implemented in a wide variety of apparatuses or devices, including a wireless handset, an integrated circuit (IC), or a set of ICs (for example, a chip set). Various components, modules, or units are described in this application to emphasize functional aspects of the apparatuses configured to perform the disclosed techniques, but are not necessarily implemented by different hardware units. Actually, as described above, various units may be combined, in combination with suitable software and/or firmware, into a codec hardware unit, or be provided by interoperative hardware units (including one or more processors described above).

In the foregoing embodiments, the description of each embodiment has respective focuses. For a part that is not described in detail in an embodiment, refer to related descriptions in other embodiments.

The foregoing descriptions are merely examples of embodiments of the disclosure, but are not intended to limit the protection scope of the disclosure. Any variation or replacement readily figured out by a person skilled in the art within the technical scope disclosed in this application shall fall within the protection scope of the disclosure. Therefore, the protection scope of the disclosure shall be subject to the protection scope of the claims.

What is claimed is:

1. A video decoding method, comprising:
   parsing a bitstream to obtain a split mode to at least two transform units (TUs) in a current coding unit (CU), wherein the split mode is used to split a coverage area of the current CU into the at least two TUs, there is no overlapping area between the at least two TUs, each of the at least two TUs has a serial number, and serial numbers of the at least two TUs are in a one-to-one correspondence with positions of the at least two TUs in the current CU;
   obtaining a transform coefficient of a luminance transform block of the current TU in the at least two TUs;
   obtaining a transform type of the luminance transform block of the current TU based on the split mode and the serial number of the current TU, wherein the transform type comprises a horizontal transform type and a vertical transform type;
   performing an inverse transform processing on the transform coefficient of the luminance transform block of the current TU based on the transform type of the luminance transform block of the current TU, to obtain a reconstructed residual of the luminance transform block of the current TU; and
   obtaining a reconstructed block of the current CU based on the reconstructed residual of the luminance transform block of the current TU.

2. The method according to claim 1, wherein the split mode is a horizontal binary split, the horizontal binary split is used to horizontally split the coverage area of the current CU into an upper TU and a lower TU, and the upper TU and the lower TU have a same size; a first transform type corresponding to a luminance transform block of the upper TU and a second transform type corresponding to a luminance transform block of the lower TU have a same horizontal transform type; and a serial number of the upper TU is TU0, and a serial number of the lower TU is TU1; and
   wherein obtaining the transform type of the luminance transform block of the current TU based on the split mode and the serial number of the current TU comprises:
   applying a discrete cosine transform (DCT)-8 type as a vertical transform type in the transform type of the luminance transform block of the current TU when the serial number of the current TU is TU0; or applying a discrete sine transform (DST)-7 type as the vertical transform type in the transform type of the luminance transform block of the current TU when the serial number of the current TU is TU1; or
   applying a DST-7 type as a vertical transform type in the transform type of the luminance transform block of the current TU when the serial number of the current TU is TU0; or applying a DCT-8 type as a vertical transform type in the transform type of the luminance transform block of the current TU when the serial number of the current TU is TU1.

3. The method according to claim 1, wherein the split mode is a vertical binary split, the vertical binary split is configured to horizontally split the coverage area of the current CU into a left TU and a right TU, and the left TU and the right TU have a same size; a first transform type corresponding to a luminance transform block of the left TU and a second transform type corresponding to a luminance transform block of the right TU have a same vertical transform type; and a serial number of the left TU is TU0, and a serial number of the right TU is TU1; and wherein obtaining the transform type of the luminance transform block of the current TU based on the split mode and the serial number of the current TU comprises:

applying a discrete cosine transform (DCT)-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or applying a discrete sine transform (DST)-7 type as a horizontal transform type in the transform type of the luminance transform block of the current TU when the serial number of the current TU is TU0; or applying a DCT-8 type as a horizontal transform type in the transform type of the luminance transform block of the current TU when the serial number of the current TU is TU1.

4. The method according to claim 1, wherein the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a first transform type corresponding to a luminance transform block of the upper TU and a second transform type corresponding to a luminance transform block of the lower TU have a same horizontal transform type, and a third transform type corresponding to a luminance transform block of the middle TU and the second transform type corresponding to the luminance transform block of the lower TU have a same horizontal transform type; and a serial number of the upper TU is TU0, a serial number of the middle TU is TU1, and a serial number of the lower TU is TU2; and wherein obtaining the transform type of the luminance transform block of the current TU based on the split mode and the serial number of the current TU comprises:

applying a discrete cosine transform (DCT)-8 type as a vertical transform type in the transform type of the luminance transform block of the current TU when the serial number of the current TU is TU0; or applying a DCT-2 type as a vertical transform type in the transform type of the luminance transform block of the current TU when the serial number of the current TU is TU1; or applying a DST-7 type as a vertical transform type in the transform type of the luminance transform block of the current TU when the serial number of the current TU is TU2;

applying a DCT-8 type as a vertical transform type in the transform type of the luminance transform block of the current TU when the serial number of the current TU is TU0; or applying a DST-7 type as the vertical transform type in the transform type of the luminance transform block of the current TU when the serial number of the current TU is TU1; or applying the DST-7 type as the vertical transform type in the transform type of the luminance transform block of the current TU when the serial number of the current TU is TU2; or applying a discrete sine transform (DST)-7 type as a vertical transform type in the transform type of the luminance transform block of the current TU when the serial number of the current TU is TU0; or applying a DCT-8 type as the vertical transform type in the transform type of the luminance transform block of the current TU when the serial number of the current TU is TU1; or applying the DCT-8 type as the vertical transform type in the transform type of the luminance transform block of the current TU when the serial number of the current TU is TU2.

5. The method according to claim 1, wherein the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein obtaining the transform type of the luminance transform block of the current TU based on the split mode and the serial number of the current TU comprises:

applying a discrete cosine transform (DCT)-8 type as a horizontal transform type in the transform type of the luminance transform block of the current TU when the serial number of the current TU is TU0; or applying a DCT-2 type as the horizontal transform type in the transform type of the luminance transform block of the current TU when the serial number of the current TU is TU1; or applying a DST-7 type as the horizontal transform type in the transform type of the luminance transform block of the current TU when the serial number of the current TU is TU2;

applying a DCT-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or applying the DST-7 type as the horizontal transform type in the transform type of the luminance transform block of the current TU when the serial number of the current TU is TU2; or applying a discrete sine transform (DST)-7 type as a horizontal transform type in the transform type of the luminance transform block of the current TU when the serial number of the current TU is TU0; or applying a DCT-8 type as the horizontal transform type in the transform type of the luminance transform block of the current TU when the serial number of the current TU is TU1; or applying the DCT-8 type as the horizontal transform type in the transform type of the luminance transform block of the current TU when the serial number of the current TU is TU2.

6. The method according to claim 1, further comprising:
parsing the bitstream to obtain indication information of the transform type of the luminance transform block of the current TU; and wherein obtaining the transform type of the luminance transform block of the current TU based on the split mode comprises: obtaining the transform type of the luminance transform block of the current TU based on the split mode and the indication information.

7. The method according to claim 2, wherein the DCT-8 type is replaced with a DCT-4 type; or the DST-7 type is replaced with a DST-4 type.

8. A video encoding/decoding device, comprising:
a memory; and
a processor coupled to the memory, wherein the processor is configured to:
parse a bitstream to obtain a split mode to at least two transform units (TUs) in a current coding unit (CU), wherein the split mode is used to split a coverage area of the current CU into the at least two TUs, there is no overlapping area between the at least two TUs, each of the at least two TUs has a serial number, and serial numbers of the at least two TUs are in a one-to-one correspondence with positions of the at least two TUs in the current CU;
obtain a transform coefficient of a luminance transform block of the current TU in the at least two TUs;
obtain a transform type of the luminance transform block of the current TU based on the split mode and the serial number of the current TU, wherein the transform type comprises a horizontal transform type and a vertical transform type;
perform an inverse transform processing on the transform coefficient of the luminance transform block of the current TU based on the transform type of the luminance transform block of the current TU, to obtain a reconstructed residual of the luminance transform block of the current TU; and
obtain a reconstructed block of the current CU based on the reconstructed residual of the luminance transform block of the current TU.

9. The video encoding/decoding device of claim 8, wherein the split mode is a horizontal binary split, the horizontal binary split is used to horizontally split the coverage area of the current CU into an upper TU and a lower TU, and the upper TU and the lower TU have a same size; a first transform type corresponding to a luminance transform block of the upper TU and a second transform type corresponding to a luminance transform block of the lower TU have a same horizontal transform type; and a serial number of the upper TU is TU0, and a serial number of the lower TU is TU1; and
wherein obtaining the transform type of the luminance transform block of the current TU based on the split mode and the serial number of the current TU comprises:
applying a discrete cosine transform (DCT)-8 type as a vertical transform type in the transform type of the luminance transform block of the current TU when the serial number of the current TU is TU0; or applying a DST-7 type as the vertical transform type in the transform type of the luminance transform block of the current TU when the serial number of the current TU is TU1; or
applying a discrete sine transform (DST)-7 type as a vertical transform type in the transform type of the luminance transform block of the current TU when the serial number of the current TU is TU0; or applying a DCT-8 type as a vertical transform type in the transform type of the luminance transform block of the current TU when the serial number of the current TU is TU1.

10. The video encoding/decoding device of claim 8, wherein the split mode is a vertical binary split, the vertical binary split is configured to horizontally split the coverage area of the current CU into a left TU and a right TU, and the left TU and the right TU have a same size; a first transform type corresponding to a luminance transform block of the left TU and a second transform type corresponding to a luminance transform block of the right TU have a same vertical transform type; and a serial number of the left TU is TU0, and a serial number of the right TU is TU1; and
wherein obtaining the transform type of the luminance transform block of the current TU based on the split mode and the serial number of the current TU comprises:
applying a discrete cosine transform (DCT)-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or
applying a discrete sine transform (DST)-7 type as a horizontal transform type in the transform type of the luminance transform block of the current TU when the serial number of the current TU is TU0; or applying a DCT-8 type as a horizontal transform type in the transform type of the luminance transform block of the current TU when the serial number of the current TU is TU1.

11. The video encoding/decoding device of claim 8, wherein the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a first transform type corresponding to a luminance transform block of the upper TU and a second transform type corresponding to a luminance transform block of the lower TU have a same horizontal transform type, and a third transform type corresponding to a luminance transform block of the middle TU and the second transform type corresponding to the luminance transform block of the lower TU have a same horizontal transform type; and a serial number of the upper TU is TU0, a serial number of the middle TU is TU1, and a serial number of the lower TU is TU2; and
wherein obtaining the transform type of the luminance transform block of the current TU based on the split mode and the serial number of the current TU comprises:
applying a discrete cosine transform (DCT)-8 type as a vertical transform type in the transform type of the luminance transform block of the current TU when the serial number of the current TU is TU0; or applying a DCT-2 type as a vertical transform type in the transform type of the luminance transform block of the current TU when the serial number of the current TU is TU1; or applying a DST-7 type as a vertical transform type in the transform type of the luminance transform block of the current TU when the serial number of the current TU is TU2;

applying a DCT-8 type as a vertical transform type in the transform type of the luminance transform block of the current TU when the serial number of the current TU is TU0; or applying a DST-7 type as the vertical transform type in the transform type of the luminance transform block of the current TU when the serial number of the current TU is TU1; or applying the DST-7 type as the vertical transform type in the transform type of the luminance transform block of the current TU when the serial number of the current TU is TU2; or applying a discrete sine transform (DST)-7 type as a vertical transform type in the transform type of the luminance transform block of the current TU when the serial number of the current TU is TU0; or applying a DCT-8 type as the vertical transform type in the transform type of the luminance transform block of the current TU when the serial number of the current TU is TU1; or applying the DCT-8 type as the vertical transform type in the transform type of the luminance transform block of the current TU when the serial number of the current TU is TU2.

12. The video encoding/decoding device of claim 8, wherein the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein obtaining the transform type of the luminance transform block of the current TU based on the split mode and the serial number of the current TU comprises:

applying a discrete cosine transform (DCT)-8 type as a horizontal transform type in the transform type of the luminance transform block of the current TU when the serial number of the current TU is TU0; or applying a DCT-2 type as the horizontal transform type in the transform type of the luminance transform block of the current TU when the serial number of the current TU is TU1; or applying a DST-7 type as the horizontal transform type in the transform type of the luminance transform block of the current TU when the serial number of the current TU is TU2;

applying a DCT-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or applying the DST-7 type as the horizontal transform type in the transform type of the luminance transform block of the current TU when the serial number of the current TU is TU2; or applying a discrete sine transform (DST)-7 type as a horizontal transform type in the transform type of the luminance transform block of the current TU when the serial number of the current TU is TU0; or applying a DCT-8 type as the horizontal transform type in the transform type of the luminance transform block of the current TU when the serial number of the current TU is TU1; or applying the DCT-8 type as the horizontal transform type in the transform type of the luminance transform block of the current TU when the serial number of the current TU is TU2.

13. The video encoding/decoding device of claim 8, wherein the processor is further configured to:

parse the bitstream to obtain indication information of the transform type of the luminance transform block of the current TU; and wherein obtaining the transform type of the luminance transform block of the current TU based on the split mode comprises:

obtaining the transform type of the luminance transform block of the current TU based on the split mode and the indication information.

14. The video encoding/decoding device of claim 9, wherein the DCT-8 type is replaced with a DCT-4 type; or the DST-7 type is replaced with a DST-4 type.

15. A non-transitory computer-readable medium storing instructions that cause a processor to perform operations comprising:

parsing a bitstream to obtain a split mode to at least two transform units (Tus) comprised in a current coding unit (CU), wherein the split mode is used to split a coverage area of the current CU into the at least two TUs, there is no overlapping area between the at least two TUs, each of the at least two TUs has a serial number, and the serial numbers of the at least two TUs are in a one-to-one correspondence with positions of the at least two TUs in the current CU;

obtaining a transform coefficient of a luminance transform block of the current TU in the at least two TUs;

obtaining a transform type of the luminance transform block of the current TU based on the split mode and the serial number of the current TU, wherein the transform type comprises a horizontal transform type and a vertical transform type;

performing an inverse transform processing on the transform coefficient of the luminance transform block of the current TU based on the transform type of the luminance transform block of the current TU, to obtain a reconstructed residual of the luminance transform block of the current TU; and obtaining a reconstructed block of the current CU based on the reconstructed residual of the luminance transform block of the current TU.

16. The non-transitory computer-readable medium of claim 15, wherein the split mode is a horizontal binary split, the horizontal binary split is used to horizontally split the coverage area of the current CU into an upper TU and a lower TU, and the upper TU and the lower TU have a same size; a first transform type corresponding to a luminance transform block of the upper TU and a second transform type corresponding to a luminance transform block of the lower TU have a same horizontal transform type; and a serial number of the upper TU is TU0, and a serial number of the lower TU is TU1; and wherein obtaining the transform type of the luminance transform block of the current TU based on the split mode and the serial number of the current TU comprises:

applying a discrete cosine transform (DCT)-8 type as a vertical transform type in the transform type of the luminance transform block of the current TU when the serial number of the current TU is TU0; or applying a DST-7 type as the vertical transform type in the transform type of the luminance transform block of the current TU when the serial number of the current TU is TU1; or applying a discrete sine transform (DST)-7 type as a vertical transform type in the transform type of the luminance transform block of the current TU when the serial number of the current TU is TU0; or applying a DCT-8 type as a vertical transform type in the transform type of the luminance transform block of the current TU when the serial number of the current TU is TU1.

17. The non-transitory computer-readable medium of claim 15, wherein the split mode is a vertical binary split, the vertical binary split is configured to horizontally split the coverage area of the current CU into a left TU and a right TU, and the left TU and the right TU have a same size; a first transform type corresponding to a luminance transform block of the left TU and a second transform type corresponding to a luminance transform block of the right TU have a same vertical transform type; and a serial number of the left TU is TU0, and a serial number of the right TU is TU1; and wherein obtaining the transform type of the luminance transform block of the current TU based on the split mode and the serial number of the current TU comprises:

applying a discrete cosine transform (DCT)-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or applying a discrete sine transform (DST)-7 type as a horizontal transform type in the transform type of the luminance transform block of the current TU when the serial number of the current TU is TU0; or applying a DCT-8 type as a horizontal transform type in the transform type of the luminance transform block of the current TU when the serial number of the current TU is TU1.

18. The non-transitory computer-readable medium of claim 15, wherein the split mode is a horizontal triple split, the horizontal triple split is configured to horizontally split the coverage area of the current CU into an upper TU, a middle TU, and a lower TU, and the upper TU and the lower TU have a same size; a size of the middle TU is twice the size of the upper TU; a first transform type corresponding to a luminance transform block of the upper TU and a second transform type corresponding to a luminance transform block of the lower TU have a same horizontal transform type, and a third transform type corresponding to a luminance transform block of the middle TU and the second transform type corresponding to the luminance transform block of the lower TU have a same horizontal transform type; and a serial number of the upper TU is TU0, a serial number of the middle TU is TU1, and a serial number of the lower TU is TU2; and wherein obtaining the transform type of the luminance transform block of the current TU based on the split mode and the serial number of the current TU comprises:

applying a discrete cosine transform (DCT)-8 type as a vertical transform type in the transform type of the luminance transform block of the current TU when the serial number of the current TU is TU0; or applying a DCT-2 type as a vertical transform type in the transform type of the luminance transform block of the current TU when the serial number of the current TU is TU1; or applying a DST-7 type as a vertical transform type in the transform type of the luminance transform block of the current TU when the serial number of the current TU is TU2;

applying a DCT-8 type as a vertical transform type in the transform type of the luminance transform block of the current TU when the serial number of the current TU is TU0; or applying a DST-7 type as the vertical transform type in the transform type of the luminance transform block of the current TU when the serial number of the current TU is TU1; or applying the DST-7 type as the vertical transform type in the transform type of the luminance transform block of the current TU when the serial number of the current TU is TU2; or applying a discrete sine transform (DST)-7 type as a vertical transform type in the transform type of the luminance transform block of the current TU when the serial number of the current TU is TU0; or applying a DCT-8 type as the vertical transform type in the transform type of the luminance transform block of the current TU when the serial number of the current TU is TU1; or applying the DCT-8 type as the vertical transform type in the transform type of the luminance transform block of the current TU when the serial number of the current TU is TU2.

19. The non-transitory computer-readable medium of claim 15, wherein the split mode is vertical triple split, the vertical triple split is configured to horizontally split the coverage area of the current CU into a left TU, a middle TU, and a right TU, and the left TU and the right TU have a same size; a size of the middle TU is twice the size of the left TU; a transform type corresponding to a luminance transform block of the left TU and a transform type corresponding to a luminance transform block of the right TU have a same vertical transform type, and a transform type corresponding to a luminance transform block of the middle TU and the transform type corresponding to the luminance transform block of the right TU have a same vertical transform type; and a serial number of the left TU is TU0, a serial number of the middle TU is TU1, and a serial number of the right TU is TU2; and wherein obtaining the transform type of the luminance transform block of the current TU based on the split mode and the serial number of the current TU comprises:

applying a discrete cosine transform (DCT)-8 type as a horizontal transform type in the transform type of the luminance transform block of the current TU when the serial number of the current TU is TU0; or applying a DCT-2 type as the horizontal transform type in the transform type of the luminance transform block of the current TU when the serial number of the current TU is TU1; or applying a DST-7 type as the horizontal transform type in the transform type of the luminance transform block of the current TU when the serial number of the current TU is TU2;

applying a DCT-8 type as a horizontal transform type in the transform type of the luminance transform block of the current TU when the serial number of the current TU is TU0; or applying a DST-7 type as the horizontal transform type in the transform type of the luminance transform block of the current TU when the serial number of the current TU is TU1; or applying the DST-7 type as the horizontal transform type in the transform type of the luminance transform block of the current TU when the serial number of the current TU is TU2; or applying a discrete sine transform (DST)-7 type as a horizontal transform type in the transform type of the luminance transform block of the current TU when the serial number of the current TU is TU0; or applying a DCT-8 type as the horizontal transform type in the transform type of the luminance transform block of the current TU when the serial number of the current TU is TU1; or applying the DCT-8 type as the horizontal transform type in the transform type of the luminance transform block of the current TU when the serial number of the current TU is TU2.

20. The non-transitory computer-readable medium of claim 16, wherein the DCT-8 type is replaced with a DCT-4 type; or the DST-7 type is replaced with a DST-4 type.

* * * * *